United States Patent
Lee et al.

(10) Patent No.: US 12,416,090 B2
(45) Date of Patent: Sep. 16, 2025

(54) CATALYST FOR HYDROGEN EVOLUTION REACTION AND PREPARING METHOD OF THE SAME

(71) Applicants: RESEARCH & BUSINESS FOUNDATION SUNGKYUNKWAN UNIVERSITY, Suwon-si (KR); INSTITUTE FOR BASIC SCIENCE, Daejeon (KR)

(72) Inventors: Hyoyoung Lee, Uiwang-si (KR); Yang Liu, Suwon-si (KR)

(73) Assignees: Research & Business Foundation Sungkyunkwan University, Suwon-si (KR); Institute For Basic Science, Daejeon (KR)

( * ) Notice: Subject to any disclaimer, the term of this patent is extended or adjusted under 35 U.S.C. 154(b) by 829 days.

(21) Appl. No.: 17/582,409

(22) Filed: Jan. 24, 2022

(65) Prior Publication Data
US 2022/0235476 A1    Jul. 28, 2022

(30) Foreign Application Priority Data
Jan. 26, 2021  (KR) .................. 10-2021-0010769

(51) Int. Cl.
C25B 11/093    (2021.01)
C25B 1/04      (2021.01)

(52) U.S. Cl.
CPC ............. *C25B 11/093* (2021.01); *C25B 1/04* (2013.01)

(58) Field of Classification Search
CPC ................................. C25B 11/09; C25B 1/04
USPC ............................................ 502/5, 302–355
See application file for complete search history.

(56) References Cited

U.S. PATENT DOCUMENTS

| | | | |
|---|---|---|---|
| 2011/0274615 A1* | 11/2011 | Ishikawa | C01B 3/06 502/343 |
| 2014/0116890 A1* | 5/2014 | Subbaraman | C25B 11/091 205/639 |
| 2022/0243343 A1* | 8/2022 | Lee | B01J 37/0225 |

FOREIGN PATENT DOCUMENTS

| | | | | |
|---|---|---|---|---|
| CN | 108172850 A | * | 6/2018 | H01M 4/88 |
| CN | 110129825 A | * | 8/2019 | B01J 23/755 |
| CN | 111905736 A | * | 11/2020 | B01J 23/745 |
| CN | 112647092 A | * | 4/2021 | C23C 8/12 |
| EP | 1239521 A1 | * | 9/2002 | B82Y 10/00 |
| KR | 10-1688472 B1 | | 12/2016 | |

OTHER PUBLICATIONS

Jing Hu et al., "A crystalline-amorphous Ni—Ni(OH)2 core-shell catalyst for the alkaline hydrogen evolution reaction." Journal of Materials Chemistry A, 8, pp. 23323-23329. (Year: 2020).*
Huang, Jinzhen et al., "Boosting Hydrogen Transfer during Volmer Reaction at Oxides/Metal Nanocomposites for Efficient Alkaline Hydrogen Evolution," ACS Energy Lett. 2019, 4 (pp. 3002-3010).
Subbaraman, Ram et al., "Trends in activity for the water electrolyser reactions on 3d M(Ni, Co, Fe, Mn) hydr(oxy)oxide catalysts," Nature Materials, vol. 11, May 2012, (pp. 550-557).
Ashwani, Kumar et al., "Modulating Interfacial Charge Density of NiP2—FeP2 via Coupling with Metallic Cu for Accelerating Alkaline Hydrogen Evolution," ACS Energy Letters, 2021, 6, (pp. 354-363).

* cited by examiner

*Primary Examiner* — Patricia L. Hailey
(74) *Attorney, Agent, or Firm* — NSIP Law

(57) ABSTRACT

Disclosed is a catalyst for hydrogen evolution reaction (HER) including: a first transition metal matrix; and a second transition metal oxide formed on the first transition metal matrix; wherein a hydroxyl group is introduced on the second transition metal oxide.

16 Claims, 38 Drawing Sheets

CATALYST FOR HYDROGEN EVOLUTION REACTION AND PREPARING METHOD OF THE SAME

CROSS REFERENCE TO RELATED APPLICATIONS

This application claims the benefit under 35 USC § 119 (a) of Korean Patent Application No. 10-2021-0010769, filed on Jan. 26, 2021, in the Korean Intellectual Property Office, the entire disclosure of which is incorporated herein by reference for all purposes.

FIELD

The present disclosure relates to a catalyst for hydrogen evolution reaction and a method for preparing the same.

DESCRIPTION OF THE RELATED ART

An alternative energy source includes a fuel cell that generates water and energy via the reaction between hydrogen and oxygen. The fuel cell is a device that generates energy via an electrochemical reaction of fuel with an oxidizing agent. Generally, hydrogen is used as the fuel and oxygen is used as the oxidizing agent.

The fuel cell has a very high power generation efficiency of 40% to 80%, generates less noise during power generation, and requires a small area for power generation. Above all, a by-product of the reaction is water, which is harmless to the environment. Accordingly, the fuel cell is attracting attention as a next-generation energy device.

In order to commercialize the fuel cell as described above, it is necessary to efficiently supply hydrogen and oxygen as reactants. A common method to obtain hydrogen and oxygen is to electrolyze water. Accordingly, there is a need for research on electrode catalysts to efficiently electrolyze water.

In this regard, studies using transition metal oxide electrode catalysts have been raised. However, there are limitations thereto in that low water dissociation rate and unfavorable hydrogen migration and coupling may occur. Further, when using nickel oxide electrode catalyst, there are problems such as interference with subsequent water molecule adsorption due to the strong affinity of a nickel moiety to a hydroxyl group generated from water dissociation. Thus, this approach has limitations in terms of being used as a catalyst for hydrogen evolution reaction.

Korean Patent No. 10-1688472 as the background art of the present disclosure relates to a catalyst for hydrogen evolution, a hydrogen evolution method, and a hydrogen evolution device. Specifically, this document relates to catalyst for hydrogen evolution from water, the catalyst containing highly absorbent alkali metal hydroxides and/or highly absorbent alkaline earth metal hydroxides, which may form a molten salt when being heated to a temperature above a melting point and maybe in contact with a metal element supplier. However, the prior art does not disclose a catalyst for hydrogen evolution reaction containing a transition metal oxide having a hydroxyl group locally introduced thereto.

CONTENT OF THE INVENTION

Problem to be Solved

The present disclosure aims to solve the problems of the prior art as described above, and thus has a purpose to provide a catalyst for hydrogen evolution reaction (HER) and a method for preparing the same.

Further, the present disclosure has a purpose to provide a water electrolysis system including the catalyst for hydrogen evolution reaction (HER).

Purposes of the present disclosure are not limited to the above-mentioned purposes, and other purposes, which are not mentioned above, may be clearly understood by those skilled in the art from the following descriptions.

In order to achieve the above technical purposes, a first aspect of the present disclosure provides a catalyst for hydrogen evolution reaction (HER) including: a first transition metal matrix; and a second transition metal oxide formed on the first transition metal matrix; wherein a hydroxyl group is introduced on the second transition metal oxide.

According to one implementation of the present disclosure, the second transition metal oxide may be functionalized by having the hydroxyl group locally introduced thereto. However, the present disclosure is not limited thereto.

According to one implementation of the present disclosure, the second transition metal oxide is formed on a substrate surface to form a hydrogen spillover channel on a hetero-interface. However, the present disclosure is not limited thereto.

According to one implementation of the present disclosure, the first transition metal and the second transition metal may be different from each other. However, the present disclosure is not limited thereto.

According to one implementation of the present disclosure, each of the first transition metal and the second transition metal independently may include one selected from the group consisting of Cu, Ni, W, Mo, Sc, Ti, V, Cr, Mn, Fe, Co, Zn, Y, Zr, Nb, Tc, Ru, Rh, Pd, Ag, Cd, Hf, Ta, Re, Os, Ir, Pt, Au, Hg, Rf, Db, Sg, Bh, Hs, Mt, Ds, Rg, Cn, and combinations thereof. However, the present disclosure is not limited thereto.

According to one implementation of the present disclosure, the second transition metal oxide may include a nanocluster having a diameter of 10 nm to 100 nm. However, the present disclosure is not limited thereto.

According to one implementation of the present disclosure, the catalyst for the hydrogen evolution reaction (HER) may include a nanowire having a diameter of 100 nm to 300 nm. However, the present disclosure is not limited thereto.

According to one implementation of the present disclosure, the catalyst for the hydrogen evolution reaction (HER) may be used as an electrode catalyst for alkaline water electrolysis. However, the present disclosure is not limited thereto.

In order to achieve the above technical purposes, a second aspect of the present disclosure provides a method for preparing a catalyst for hydrogen evolution reaction (HER), the method including: bonding a second transition metal oxide to a first transition metal matrix; and introducing a hydroxyl group on the second transition metal oxide using cyclic voltammetry (CV) method.

According to one implementation of the present disclosure, in the introduction of the hydroxyl group, the second transition metal oxide may be functionalized by having the hydroxyl group locally introduced thereto. However, the present disclosure is not limited thereto.

According to one implementation of the present disclosure, the bonding of the second transition metal oxide to the first transition metal matrix may be achieved by one selected from the group consisting of an electrodeposition method, a coevaporation method, a sputtering method, an RF sputtering method, a DC sputtering method, a reactive sputtering method, an ion beam sputtering method, an evaporation method, a chemical vapor deposition (CVD) method, a low-pressure chemical vapor deposition (LPCVD) method, a plasma-enhanced chemical vapor deposition (PECVD) method, an ion plating method, an E-beam evaporation method, a metal-organic chemical vapor deposition (MOCVD) method, a molecular beam epitaxy (MBE) method, a screen printing method, a particle deposition method, an atomic layer epitaxy method, and combinations thereof. However, the present disclosure is not limited thereto.

According to one implementation of the present disclosure, the cyclic voltammetry may be performed under basic electrolyte. However, the present disclosure is not limited thereto.

According to one implementation of the present disclosure, the basic electrolyte may include one selected from the group consisting of KOH, NaOH, LiOH, Ca(OH)2, NaBH$_4$, and combinations thereof. However, the present disclosure is not limited thereto.

According to one implementation of the present disclosure, the basic electrolyte may be used at a concentration of 0.05 M to 5 M. However, the present disclosure is not limited thereto.

According to one implementation of the present disclosure, the method may further include: washing and drying a product prepared in the bonding step; and annealing the product. However, the present disclosure is not limited thereto.

According to one implementation of the present disclosure, the annealing step may be performed in a temperature range of 100° C. to 700° C. However, the present disclosure is not limited thereto.

In order to achieve the above technical purposes, a third aspect of the present disclosure provides a water electrolysis system including the catalyst for the hydrogen evolution reaction (HER) according to the first aspect of the present disclosure.

The above-described problem solving means are merely exemplary and should not be construed as limiting the present disclosure. In addition to the exemplary embodiments as described above, additional embodiments may exist in the drawings and detailed description of the disclosure.

Effects of the Invention

Research using the conventional transition metal oxide electrode catalyst has been raised. However, there are limitations thereto in that slow water dissociation and unfavorable hydrogen migration and coupling occur. According to the means of solving the problems of the present disclosure described above, in the catalyst for the hydrogen evolution reaction (HER) according to the present disclosure, the second transition metal oxide is functionalized by having the hydroxyl group locally introduced to the second transition metal oxide, thereby causing rapid water dissociation and promoting the hydrogen spillover, and thus achieving the excellent HER performance.

Further, the conventional transition metal oxide was used as the alkaline HER due to its excellent water absorption properties. However, the utility of nickel oxide is still not high in non-acidic conditions, the water dissociation rate thereof is low, and due to its strong oxophilicity, the nickel oxide has a strong affinity to the hydroxyl group (OH$^-$) generated by water electrolysis, thereby interfering with subsequent adsorption of water molecules. Inflexible interaction with O sites limits the migration of H$^+$, there is a limitation that generation of hydrogen is low. Accordingly, in the catalyst for hydrogen evolution reaction (HER) according to the present disclosure, an external hydroxyl group is added to the second transition metal oxide to promote the water dissociation, and may optimize an energy level of cationic sites for adsorption-desorption of oxygen-containing intermediate.

Further, in the catalyst for hydrogen evolution reaction (HER) according to the present disclosure, the active ingredient is integrated with the first transition metal matrix (e.g., copper) with weak hydrogen binding energy, thereby promoting the migration and coupling of hydride to improve rapid hydrogen formation.

Further, in the catalyst for hydrogen evolution reaction (HER) according to the present disclosure, an external hydroxyl group is introduced to the second transition metal oxide to control an electronic configuration of the adjacent transition metal and O sites, and weaken the affinity of the second transition metal to oxygen so that the catalyst may have rapid water dissociation ability.

Further, in the catalyst for the hydrogen evolution reaction (HER) according to the present disclosure, a hydrogen spillover channel is formed on a hetero-interface, so that the second transition metal oxide on the first transition metal matrix with weak hydrogen binding energy induces rapid hydrogen spillover and coupling, thus ensuring the rapid release of hydrogen.

Further, the conventional nickel oxide electrode catalyst has problems such as interference with subsequent water molecule adsorption due to the strong affinity of the nickel site to the hydroxyl group generated by water electrolysis, so there is a limitation in being used as a catalyst for hydrogen evolution reaction. However, the catalyst for hydrogen evolution reaction (HER) according to the present disclosure contains a hydroxyl group on a surface thereof, so that the affinity of the surface to oxygen is reduced, so that the hydroxyl group is easily released therefrom, continuous adsorption of the hydroxyl group and water is easy, the water dissociation rate is improved. Thus, the catalyst may be usefully used as a high-performance catalyst capable of rapid spillover and coupling of hydrogen.

Further, the catalyst for the hydrogen evolution reaction (HER) according to the present disclosure uses inexpensive non-precious metal elements such as Cu, Ni, Fe, and P. The catalyst for the hydrogen evolution reaction (HER) may have better performance than that of the platinum catalyst. Therefore, the catalyst for hydrogen evolution reaction (HER) may realize a high-performance catalyst for the hydrogen evolution reaction (HER) at a low price.

Further, the method for preparing the catalyst for hydrogen evolution reaction (HER) according to the present disclosure may prepare the catalyst using a simple process of locally introducing a hydroxyl group using cyclic voltammetry. Thus, the preparation process may be simplified, it may be manufactured at a low cost, and mass production may be easy, and economic efficiency may be excellent.

However, effects obtainable from the present disclosure are not limited to the above-described effects, and other effects may exist.

BRIEF DESCRIPTION OF THE DRAWINGS

The above and other aspects, features, and other advantages of the present disclosure will be more clearly understood from the following detailed description taken in conjunction with the accompanying drawings, in which:

FIGS. 2A-2I are graphs identifying the generation and adsorption of a hydroxyl group of the catalyst for the hydrogen evolution reaction (HER) according to an embodiment of the present disclosure;

DETAILED DESCRIPTION OF THE EMBODIMENT

Figure 1A:
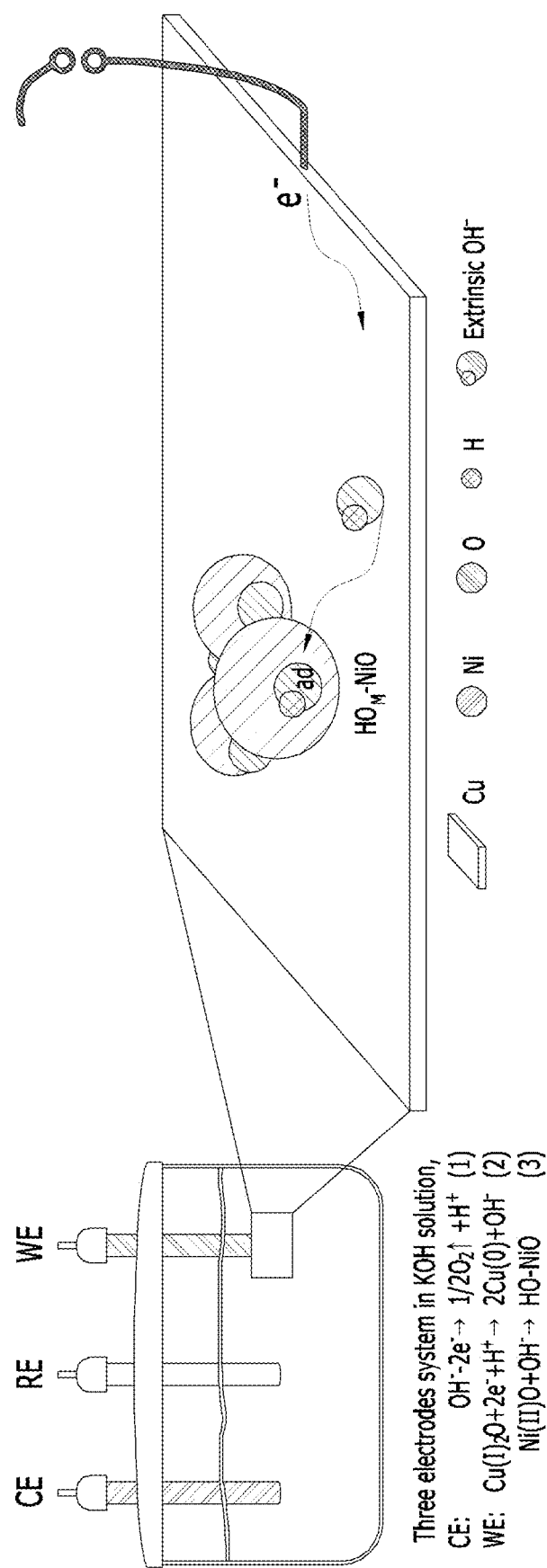
FIGS. 1A-1B are a schematic diagram and an SEM image of a catalyst for hydrogen evolution reaction (HER) according to an embodiment of the present disclosure.

Hereinafter, an embodiment of the present disclosure will be described in detail so that a person of ordinary skill in the art to which the present disclosure belongs may easily implement the disclosure with reference to the accompanying drawings.

However, the present disclosure may be implemented in several different forms and is not limited to the embodiment described herein. Further, in order to clearly describe the present disclosure in the drawings, parts irrelevant to the description are omitted, and similar reference numerals are attached to similar parts throughout the specification.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

As used herein, the term "substantially," "about," and similar terms are used as terms of approximation and not as terms of degree, and are intended to account for the inherent deviations in measured or calculated values that would be recognized by those of ordinary skill in the art. The term may be used to prevent unauthorized exploitation by an unauthorized infringer to design around accurate or absolute figures provided to help understand the present disclosure. Further, in the present disclosure, "step to" or "step of" does not mean "step for".

In addition, where features or aspects of the disclosure are described in terms of Markush groups, those skilled in the art will recognize that the disclosure is also thereby described in terms of any individual member or subgroup of members of the Markush group. Throughout the present disclosure, the term "combinations thereof" included in the expression of the Markush form means mixtures or combinations of at least one selected from the group consisting of components described in the expression of the Markush form.

Throughout the present disclosure, a reference to "A and/or B" means "A or B, or A and B".

Hereinafter, a catalyst for hydrogen evolution reaction of the present disclosure and a method for preparing the same will be described in detail with reference to implementation and examples and drawings. However, the present disclosure is not limited to these implementations and embodiments and drawings.

In order to achieve the above technical purposes, a first aspect of the present disclosure provides a catalyst for hydrogen evolution reaction (HER) including: a first transition metal matrix; and a second transition metal oxide formed on the first transition metal matrix; wherein a hydroxyl group is introduced on the second transition metal oxide.

The conventional nickel oxide electrode catalyst has problems such as interference with subsequent water molecule adsorption due to the strong affinity of the nickel site to the hydroxyl group generated by water electrolysis. However, the catalyst for hydrogen evolution reaction (HER) according to the present disclosure contains a hydroxyl group on a surface thereof, so that the affinity of the surface to oxygen is reduced, so that the hydroxyl group is easily released therefrom, continuous adsorption of the hydroxyl group and water is easy, the water dissociation rate is improved. Thus, the catalyst may be usefully used as a high-performance catalyst capable of rapid spillover and coupling of hydrogen.

In the meantime, unlike acidic electrolytes, the alkaline HER has a problem in that a reaction barrier is higher due to additional water dissociation and desorption of the oxygen-containing intermediate. Thus, a current density is lowered and an overvoltage is higher. Thus, it is not easy to use the alkaline HER even when expensive platinum is used.

In this regard, the transition metal oxide was used as the alkaline HER due to its excellent water absorption properties. However, the utility of nickel oxide is still not high in non-acidic conditions, the water dissociation rate thereof is low, and due to its strong oxophilicity, the nickel oxide has a strong affinity to the hydroxyl group ($OH^-$) generated by water electrolysis, thereby interfering with subsequent adsorption of water molecules. Inflexible interaction with O sites limits the migration of $H^+$, such that generation of hydrogen is low.

However, in the catalyst for hydrogen evolution reaction (HER) according to the present disclosure, an external hydroxyl group is added to the second transition metal oxide to promote the water dissociation, and may optimize an energy level of cationic sites for adsorption-desorption of oxygen-containing intermediate.

Further, in the catalyst for hydrogen evolution reaction (HER) according to the present disclosure, the active ingredient is integrated with the first transition metal matrix (e.g., copper) with weak hydrogen binding energy, thereby promoting migration and coupling of hydride to improve rapid hydrogen formation.

Further, in the catalyst for hydrogen evolution reaction (HER) according to the present disclosure, an external hydroxyl group is introduced to the second transition metal oxide to control an electronic configuration of the adjacent transition metal and O sites, and weaken the affinity of the active surface of the second transition metal to oxygen so that the catalyst may have rapid water dissociation ability.

According to one implementation of the present disclosure, the second transition metal oxide may be functionalized by having the hydroxyl group locally introduced thereto. However, the present disclosure is not limited thereto.

Research using the conventional transition metal oxide electrode catalyst has been raised. However, there are limitations thereto in that slow water dissociation and unintentional hydrogen migration and coupling occur. According to the means of solving the problems of the present disclosure described above, in the catalyst for the hydrogen evolution reaction (HER) according to the present disclosure, the second transition metal oxide is functionalized by having the hydroxyl group locally introduced to the second transition metal oxide, thereby causing rapid water dissociation and promoting the hydrogen spillover, and thus achieving the excellent HER performance.

According to one implementation of the present disclosure, the second transition metal oxide may be formed on a substrate surface to form a hydrogen spillover channel on a hetero-interface. However, the present disclosure is not limited thereto.

The hetero-interface is an interface between a component with strong hydrogen adsorption characteristics and a component with efficient hydrogen release characteristics and is constructed to induce rapid hydrogen spillover.

Further, in the catalyst for the hydrogen evolution reaction (HER) according to the present disclosure, a hydrogen spillover channel is formed on a hetero-interface, so that the second transition metal oxide on the first transition metal matrix with weak hydrogen binding energy induces rapid hydrogen spillover and coupling, thus ensuring the rapid release of hydrogen.

Specifically, a high rate hydrogen spillover channel from the hetero-interface to the coupling site on the first transition metal matrix may be formed such that excellent HER motility may be secured in a non-acidic medium.

That is, the catalyst for hydrogen evolution reaction (HER) according to the present disclosure promotes water electrolysis and may provide excellent properties of rapid hydrogen spillover to NiO via the introduction of the hydroxyl group and the formation of the hetero-interface. Therefore, the present inventors have proposed a method for facilitating HER kinetics via the combination of chemical modification and physical hetero-interface formation.

According to one implementation of the present disclosure, the first transition metal and the second transition metal may be different from each other. However, the present disclosure is not limited thereto.

According to one implementation of the present disclosure, each of the first transition metal and the second transition metal independently may include one selected from the group consisting of Cu, Ni, W, Mo, Sc, Ti, V, Cr, Mn, Fe, Co, Zn, Y, Zr, Nb, Tc, Ru, Rh, Pd, Ag, Cd, Hf, Ta, Re, Os, Ir, Pt, Au, Hg, Rf, Db, Sg, Bh, Hs, Mt, Ds, Rg, Cn, and combinations thereof. However, the present disclosure is not limited thereto.

For example, the first transition metal may be copper, and the second transition metal may be nickel. However, the present disclosure is not limited thereto.

In this case, active NiO may be grafted onto the copper surface to provide NiO/Cu. As will be described later, the subsequent introduction of the hydroxyl group may be easily realized through an electrochemical strategy.

The catalyst for the hydrogen evolution reaction (HER) according to the present disclosure may include inexpensive non-precious metal elements such as Cu, Ni, Fe, and P. The catalyst for the hydrogen evolution reaction (HER) may have better performance than that of the platinum catalyst. Therefore, the catalyst for the hydrogen evolution reaction (HER) may provide a high-performance catalyst for the hydrogen evolution reaction (HER) at a low price.

According to one implementation of the present disclosure, the second transition metal oxide may include a nanocluster having a diameter of about 10 nm to about 100 nm. However, the present disclosure is not limited thereto.

For example, the second transition metal oxide may include the nanocluster having a diameter of about 30 nm to about 50 nm. However, the present disclosure is not limited thereto.

According to one implementation of the present disclosure, the catalyst for the hydrogen evolution reaction (HER) may include a nanowire having a diameter of about 100 nm to about 300 nm. However, the present disclosure is not limited thereto.

For example, the catalyst for the hydrogen evolution reaction (HER) may include a nanowire having a diameter of about 200 nm. However, the present disclosure is not limited thereto.

According to one implementation of the present disclosure, the catalyst for the hydrogen evolution reaction (HER) may be used as an electrode catalyst for alkaline water electrolysis. However, the present disclosure is not limited thereto.

As described above, unlike acidic electrolytes, the alkaline HER has a problem in that a reaction barrier is higher due to additional water dissociation and desorption of the oxygen-containing intermediate. Thus, a current density is lowered and an overvoltage is higher. Thus, it is not easy to use the alkaline HER even when expensive platinum is used.

Accordingly, in the catalyst for hydrogen evolution reaction (HER) according to the present disclosure, an external hydroxyl group is added to the second transition metal oxide to promote the water dissociation, and may optimize an energy level of cationic sites for adsorption-desorption of oxygen-containing intermediate.

Further, in the catalyst for hydrogen evolution reaction (HER) according to the present disclosure, the active ingredient is integrated with the first transition metal matrix (e.g., copper) with weak hydrogen binding energy, thereby promoting the migration and coupling of hydride to improve rapid hydrogen formation.

Further, in the catalyst for hydrogen evolution reaction (HER) according to the present disclosure, an external hydroxyl group is introduced to the second transition metal oxide to control an electronic configuration of the adjacent transition metal and O sites, and weaken the affinity of the active surface of the second transition metal to oxygen so that the catalyst may have rapid water dissociation ability.

Further, in order to achieve the above technical purposes, a second aspect of the present disclosure provides a method for preparing a catalyst for hydrogen evolution reaction (HER), the method including: bonding a second transition metal oxide to a first transition metal matrix; and introducing a hydroxyl group on the second transition metal oxide using cyclic voltammetry (CV).

In descriptions of the method for preparing the catalyst for the hydrogen evolution reaction (HER) of the second aspect of the present disclosure, detailed descriptions duplicate with those of the first aspect of the present disclosure are omitted. Even when the descriptions are omitted, the contents as described in the first aspect of the present disclosure may be equally applied to the second aspect of the present disclosure.

Further, the method for preparing the catalyst for hydrogen evolution reaction (HER) according to the present disclosure may prepare the catalyst using a simple process of locally introducing a hydroxyl group using cyclic voltammetry. Thus, the preparation process may be simplified, it may be manufactured at a low cost, and mass production may be easy, and the economic efficiency may be excellent.

According to one implementation of the method, in the introduction of the hydroxyl group, the second transition metal oxide is functionalized by having the hydroxyl group locally introduced thereto. However, the present disclosure is not limited thereto.

According to one implementation of the method, the bonding of the second transition metal oxide to the first transition metal matrix is achieved by one selected from the group consisting of an electrodeposition method, a coevaporation method, a sputtering method, an RF sputtering method, a DC sputtering method, a reactive sputtering method, an ion beam sputtering method, an evaporation method, a chemical vapor deposition (CVD) method, a low pressure chemical vapor deposition (LPCVD) method, a plasma enhanced chemical vapor deposition (PECVD) method, an ion plating method, an E-beam evaporation method, a metal-organic chemical vapor deposition (MOCVD) method, a molecular beam epitaxy (MBE) method, a screen printing method, a particle deposition method, an atomic layer epitaxy method, and combinations thereof. However, the present disclosure is not limited thereto.

For example, the bonding of the second transition metal oxide thereto may be performed using an electrodeposition method. However, the present disclosure is not limited thereto.

According to one implementation of the present disclosure, the cyclic voltammetry may be performed under a basic electrolyte. However, the present disclosure is not limited thereto.

According to one implementation of the present disclosure, the basic electrolyte may include one selected from the group consisting of KOH, NaOH, LiOH, Ca(OH)$_2$, NaBH$_4$, and combinations thereof. However, the present disclosure is not limited thereto.

For example, the basic electrolyte may be KOH. However, the present disclosure is not limited thereto.

According to one implementation of the present disclosure, the basic electrolyte may be used at a concentration of about 0.05 M to about 5 M. However, the present disclosure is not limited thereto.

For example, the basic electrolyte may be used at a concentration of about 0.1 M to about 3 M. However, the present disclosure is not limited thereto.

Preferably, the basic electrolyte may be used at a concentration of about 1 M. However, the present disclosure is not limited thereto.

As will be described later, the concentration of the basic electrolyte affects a ratio of Cu$_2$O, the chemical state of NiO, and the introduction of hydroxyl groups such as the OH$^-$ coverage. Therefore, the optimal basic electrolyte concentration has a very significant effect on the successful introduction of the hydroxyl groups and improvement of catalyst properties.

According to one implementation of the method, the method further may include: washing and drying a product prepared in the bonding step; and annealing the product. However, the present disclosure is not limited thereto.

According to one implementation of the method, the annealing step may be performed in a temperature range of 100° C. to 700° C. However, the present disclosure is not limited thereto.

For example, the annealing may be performed in a temperature range of about 300° C. to about 500° C. However, the present disclosure is not limited thereto.

A third aspect of the present disclosure provides a water electrolysis system including the catalyst for hydrogen evolution reaction (HER) according to the first aspect of the present disclosure.

In describing the water electrolysis system of the third aspect of the present disclosure, detailed descriptions duplicate with those of the first aspect and the second aspect of the present disclosure are omitted. Even when the descriptions are omitted, the contents described in the first aspect of the present disclosure and the second aspect thereof may be equally applied to the third aspect of the present disclosure.

The present disclosure will be described in more detail through the following examples, but the following examples are only for description and are not intended to limit the scope of the present disclosure.

EXAMPLE

A Cu network substrate was prepared by a previously reported method (Yu, L.; Zhou, H.; Sun, J.; Qin, F.; Yu, F.; Bao, J.; Yu, Y.; Chen, S.; Ren, Z., Cu nanowires shelled with NiFe layered double hydroxide nanosheets as bifunctional electrocatalysts for overall water splitting. *Energy & Environmental Science* 2017, 10 (8), 1820-1827).

Then, NiOOH was electro-deposited on the Cu network substrate (1 cm$^2$) under a voltage of −1.2 V vs. Ag/AgCl for 100 secs, 150 secs, 200 secs, 300 secs, and 400 secs, respectively, using the substrate as a working electrode, using a graphite rod as a counter electrode, and using a saturated Ag/AgCl as a reference electrode, and using 0.2 M Ni(NO$_3$)$_2$·6H$_2$O solution.

Then, after washing the substrate several times with water, the substrate was vacuum dried to synthesize a NiOOH/Cu substrate.

Then, the NiOOH/Cu substrate was annealed at a temperature of each of 300° C., 400° C., and 500° C. for 3 hours in an argon atmosphere using a tube furnace under vacuum to form NiO/Cu$_2$O/Cu.

Then, electrochemical modification in which OH$^-$ was introduced to NiO using the cyclic voltammetry (CV) of 15 cycles in a potential range of −0.5 V to 0.2 V vs. RHE using the NiO/Cu$_2$O/Cu as a working electrode was performed. The cyclic voltammetry was performed using a scan rate of 0.02 mV/s and KOH electrolyte of each of 0.1 M, 1 M, and 3 M.

After the electrochemical modification, washing and vacuum drying were performed. Thus, depending on the concentration of the KOH electrolyte, each of HO$_L$—NiO/Cu (KOH concentration 0.1 M), HO$_M$—NiO/Cu (KOH concentration 1 M), and HO$_H$—NiO/Cu (KOH concentration 4 M) was synthesized.

Comparative Example 1

NiOOH powders were scraped off from the substrate of the NiOOH/Cu sample of Example 1. Then, the powder was annealed in an argon atmosphere at 400° C. for 3 hours using a tube furnace in a vacuum state to produce NiO powders, and then the NiO powders were coated on Cu so as to have the same mass density as that of HO—NiO on Cu.

Then, finally, NiO/Cu was synthesized by annealing a product in an argon atmosphere at 300° C. for 1 hour to ensure a strong interaction between NiO and Cu.

Comparative Example 2

In each of Co, Fe, Mn, and Cr-based metal oxide catalysts, a synthesis process was carried out in the same manner as that in Example 1 except that the Ni metal precursor of Example 1 was replaced with each of Co(NO$_3$)$_2$·6H$_2$O, Fe(NO$_3$)$_3$·9H$_2$O, Mn(NO$_3$)$_2$·4H$_2$O, and Cr(NO$_3$)$_2$·4H$_2$O.

Experimental Example 1

Figure 1B:
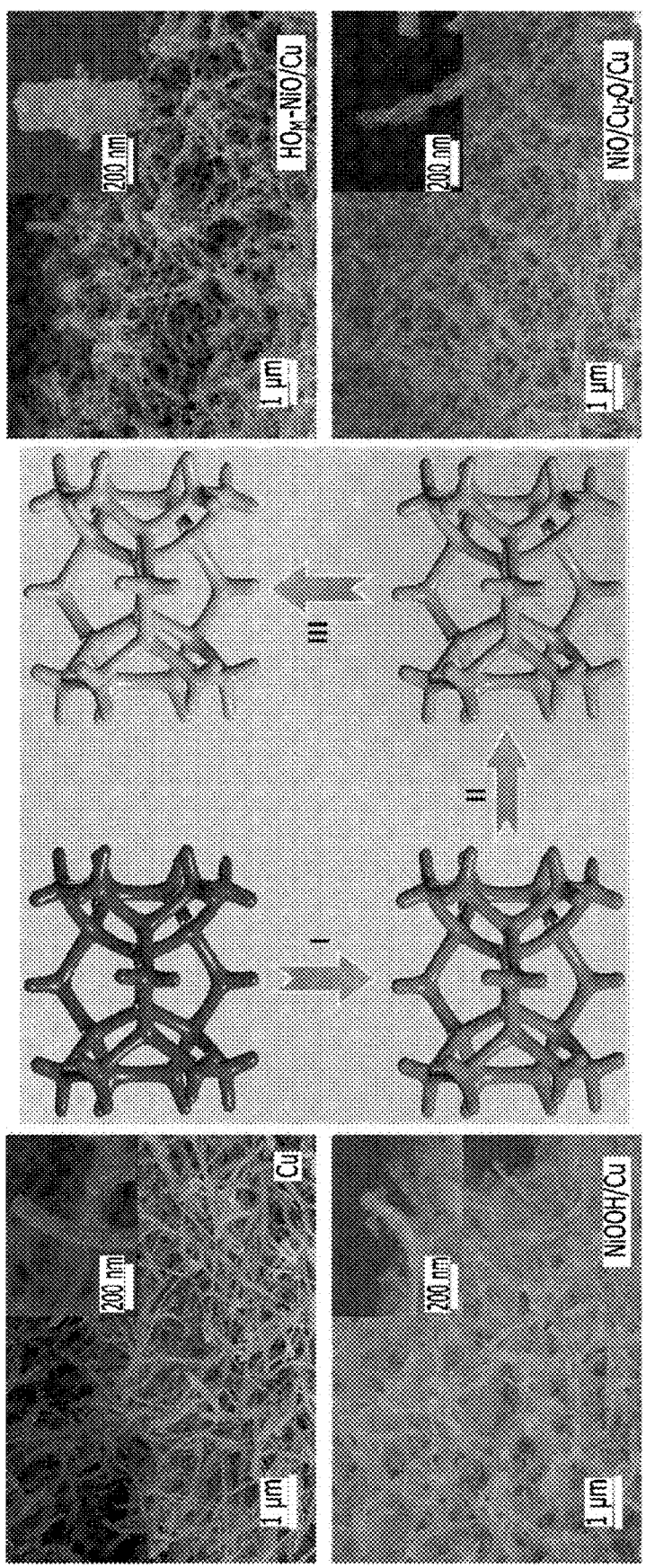

FIGS. 1A-1B are a schematic diagram and an SEM image of a catalyst for hydrogen evolution reaction (HER) according to an embodiment of the present disclosure.

FIG. 1A is a schematic diagram of a 3-electrode system used to introduce a hydroxyl group to NiO, and FIG. 1B is a schematic diagram of the process of preparing an HER catalyst in an alkaline solution via electrochemical modification as the introduction of the external hydroxyl group to NiO in a catalyst for hydrogen evolution reaction (HER) according to an embodiment of the present disclosure.

Specifically, when the counter electrode (CE) releases oxygen gas (O$_2$) and protons (H$^+$) into the solution and the working electrode (WE), NiO/Cu$_2$O/Cu accepts electrons from the circuit and the surface. The Cu(I) species are preferentially reduced to the metal phase, during which negatively charged OH$^-$ may be adsorbed spontaneously to the cationic Ni atoms.

FIG. 1C to FIG. 1F are SEM images of Cu (FIG. 1C), NiOOH/Cu (FIG. 1D), NiO/Cu$_2$O/Cu (FIG. 1E), and HO$_M$—NiO/Cu nanowire (FIG. 1F) of the catalyst for hydrogen evolution reaction (HER) according to an embodiment of the present disclosure.

Thus, it was identified that the reductive CV process forms a network with interlaced nanowires with a diameter of about 200 nm with little change in shape. In addition, it was identified that NiO nanoclusters of 30 nm to 50 nm were formed in an uniform distribution on the Cu surface. Further, it was identified based on scanning electron microscopy (SEM) and transmission electron microscopy (TEM) element maps that NiO nanocrystals were uniformly dispersed on the Cu surface.

Experimental Example 2

FIGS. 2A-2I are graphs identifying the generation and adsorption of the hydroxyl group on the catalyst for the hydrogen evolution reaction (HER) according to an embodiment of the present disclosure.

Figure 2A:
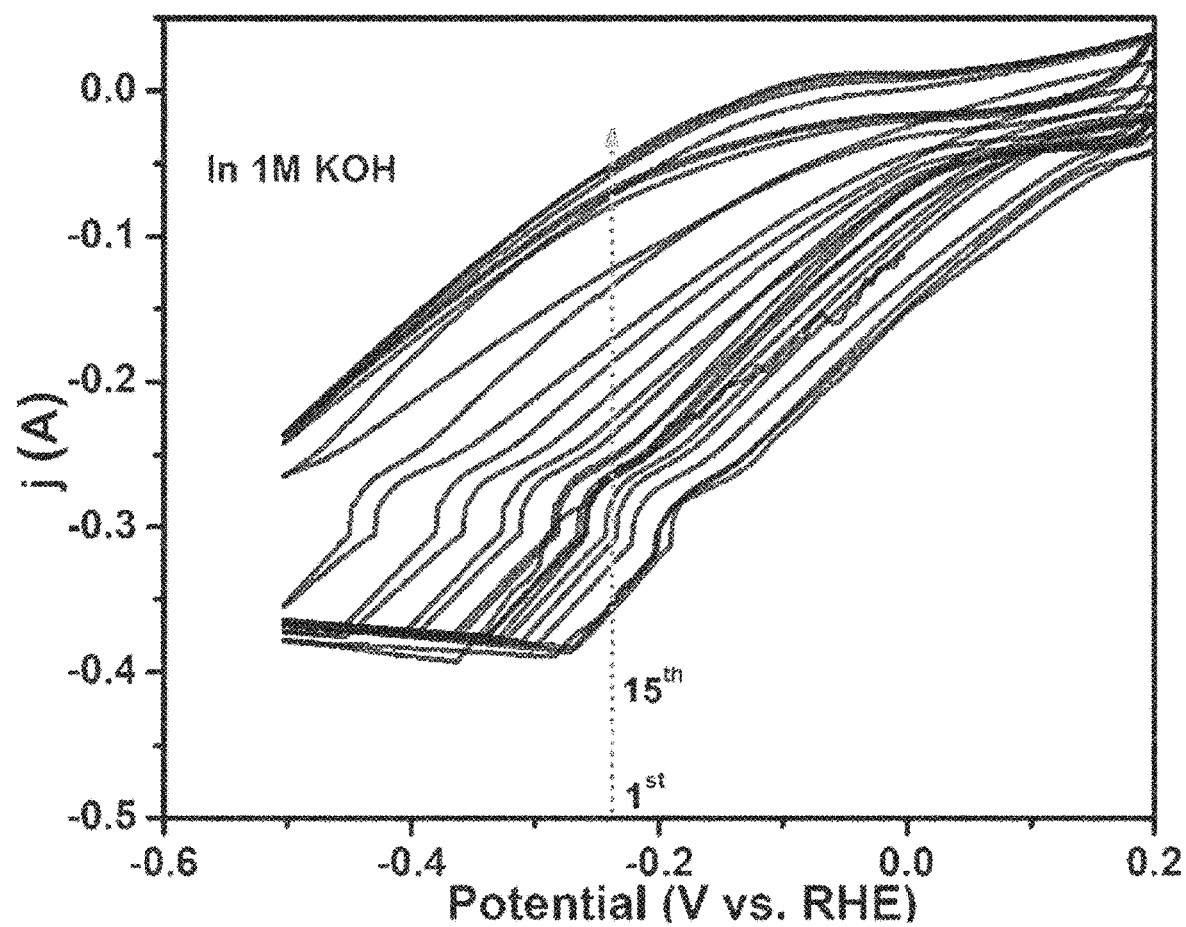

FIG. 2A is a graph showing cathodic electrode cyclic voltage curves of initial 15 cycles at the working electrode during Cu(I)$_2$O conversion and OH$^-$ adhering to NiO/Cu without hydrogen bubbles and oxygen generations, and O$_2$ generation on a (CE) counter electrode. The unit of the vertical axis is ampere (A), and the surface area of the working electrode is 0.5 cm cm$^{-2}$.

Thus, during the initial 15 cycles of CV at intermediate concentration (1 M) KOH, an original curve exhibited an abnormal onset potential, and then gradually decreased until it overlapped an HER potential range, but hydrogen bubbling was not observed. This may be due to the first-occurring irreversible reduction of Cu(I)$_2$O due to its high redox potential (0.3168 V).

Figure 2B:
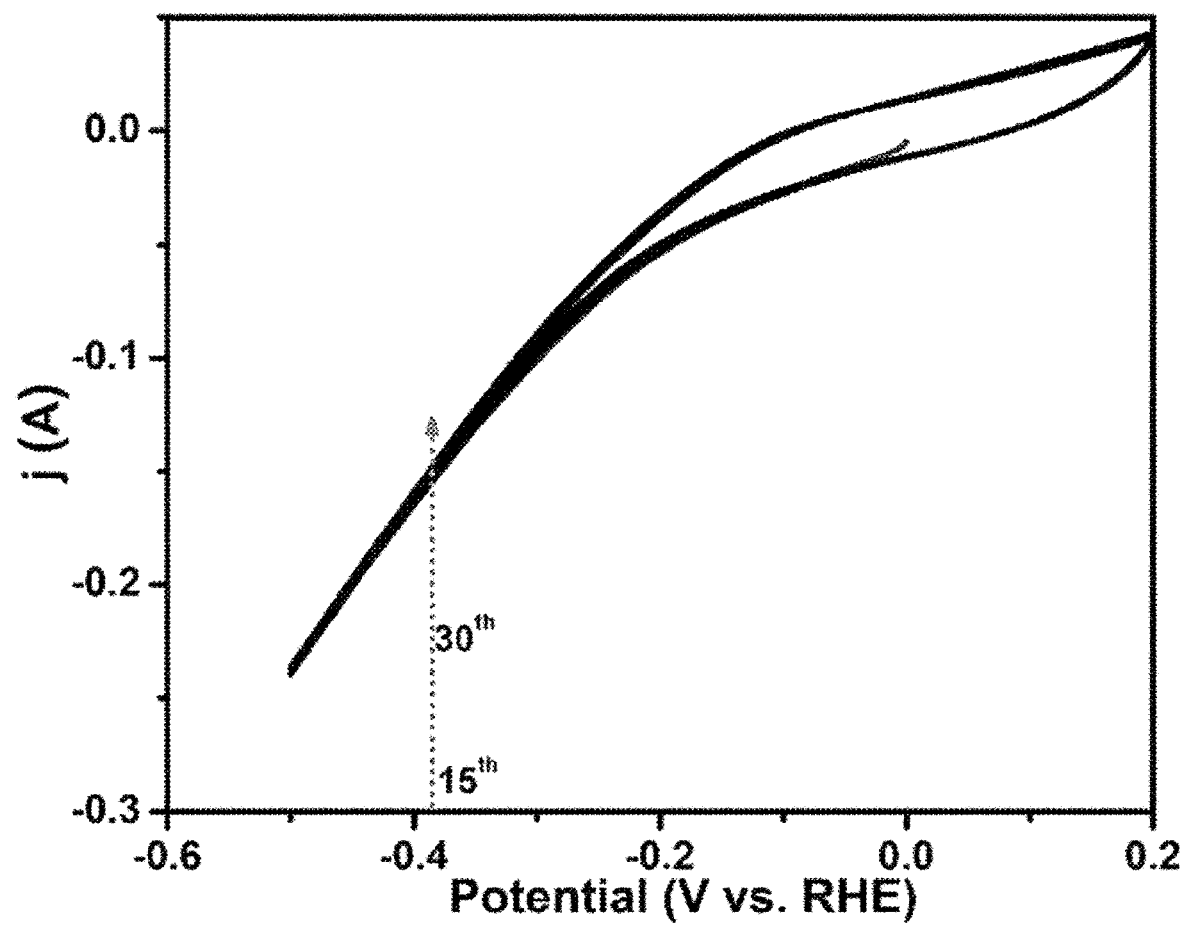

FIG. 2B is a graph showing that the CV (Cyclic Voltammetry) of subsequent 15 cycles may form an active compound with causing hydrogen bubbling while the component is stabilized.

Thus, it was identified that, after the initial 15 cycles, hydrogen evolution occurred, the active ingredient was fully exposed, and finally, the HO$_M$—NiO/Cu model was formed. Continuous hydrogen evolution was observed for further subsequent 15 to 30 cycles, thus indicating the generation of an active electrocatalyst.

Figure 2C:
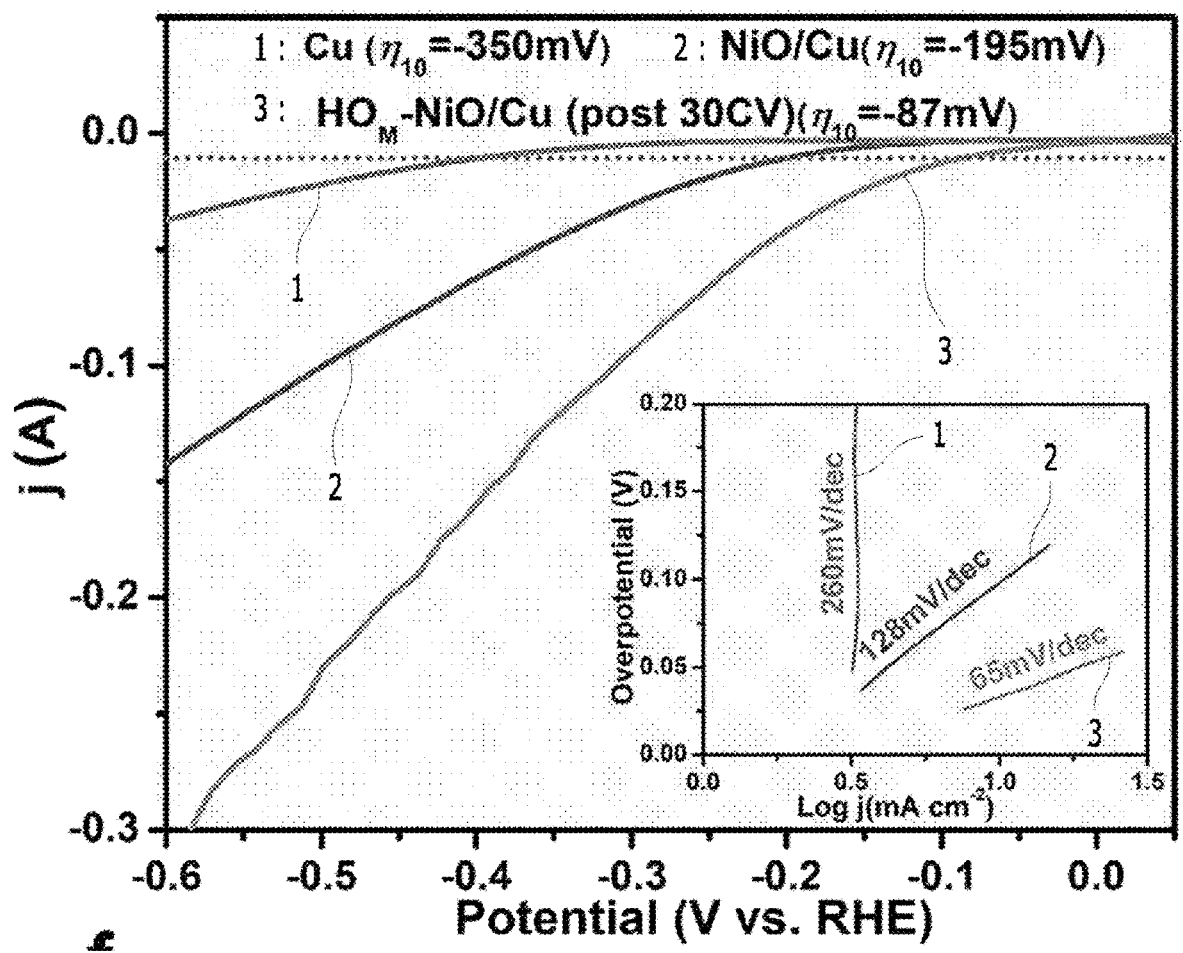

FIG. 2C is a graph showing that the original, unmodified LSV curve shows a significant improvement of HER after HO$^-$ adsorption compared to those of NiO/Cu and Cu.

Thus, it was identified that the HO$_M$—NiO/Cu material exhibited an excellent improvement in HER performance with a smaller Tafel slope, compared to those of NiO/Cu and Cu, based on original polarization curves collected and recorded at 1 M KOH. This suggests that the hydroxyl group introduction strategy according to the present disclosure significantly improves the HER dynamics of NiO.

Figure 2D:
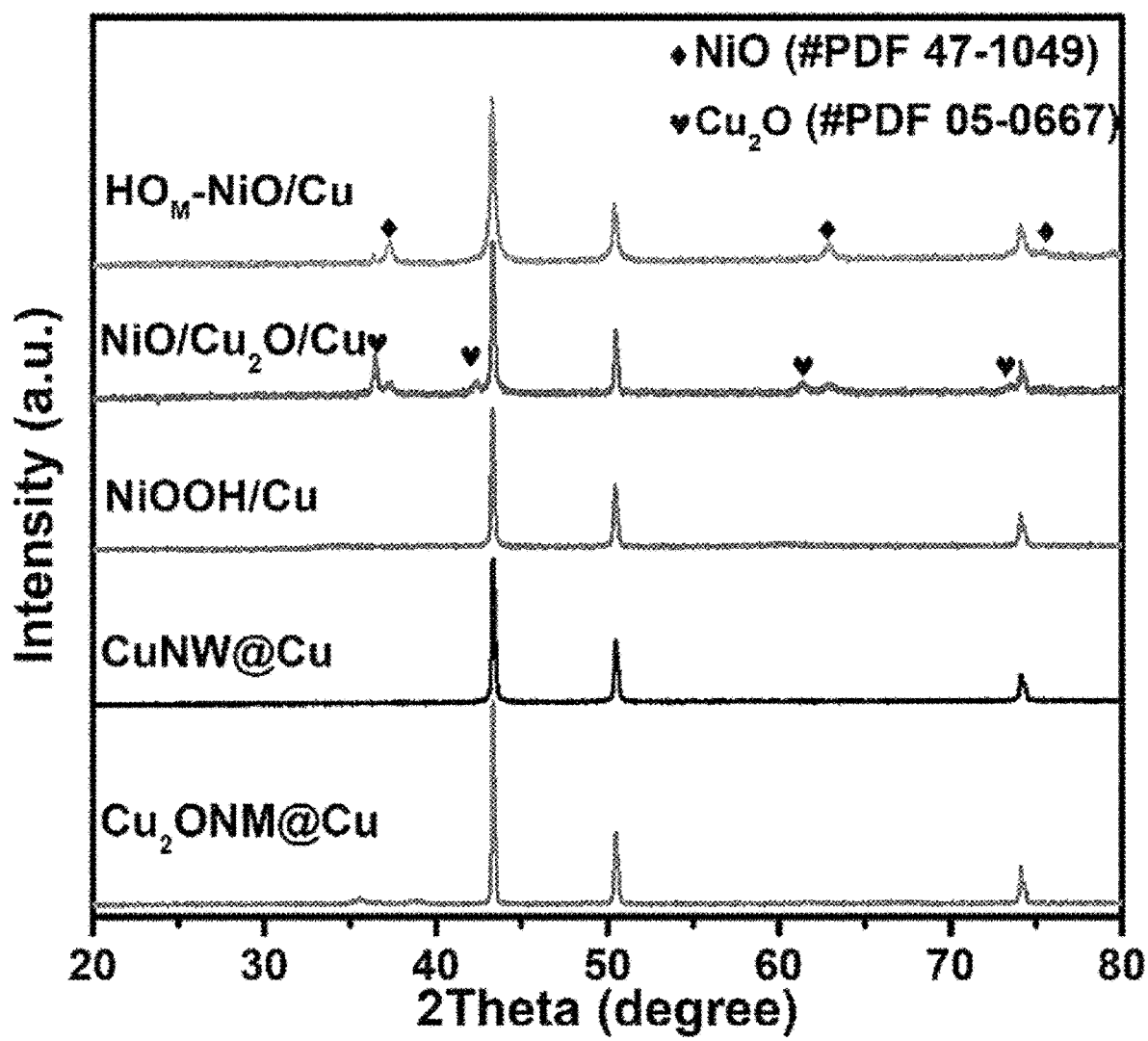

FIG. 2D is the XRD spectrum showing the evolution of the catalyst.

Thus, it was identified using X-ray diffraction (XRD) that the evolution of the catalyst occurred, i.e., the crystallization of NiO together with concentrated metallic Cu remained distinct, and peaks belonging to Cu(I)$_2$O disappeared during the initial 15 CV cycles. The initial 15 CV cycles indicate electron migration between the hetero-interface of Cu and NiO.

Figure 2E:
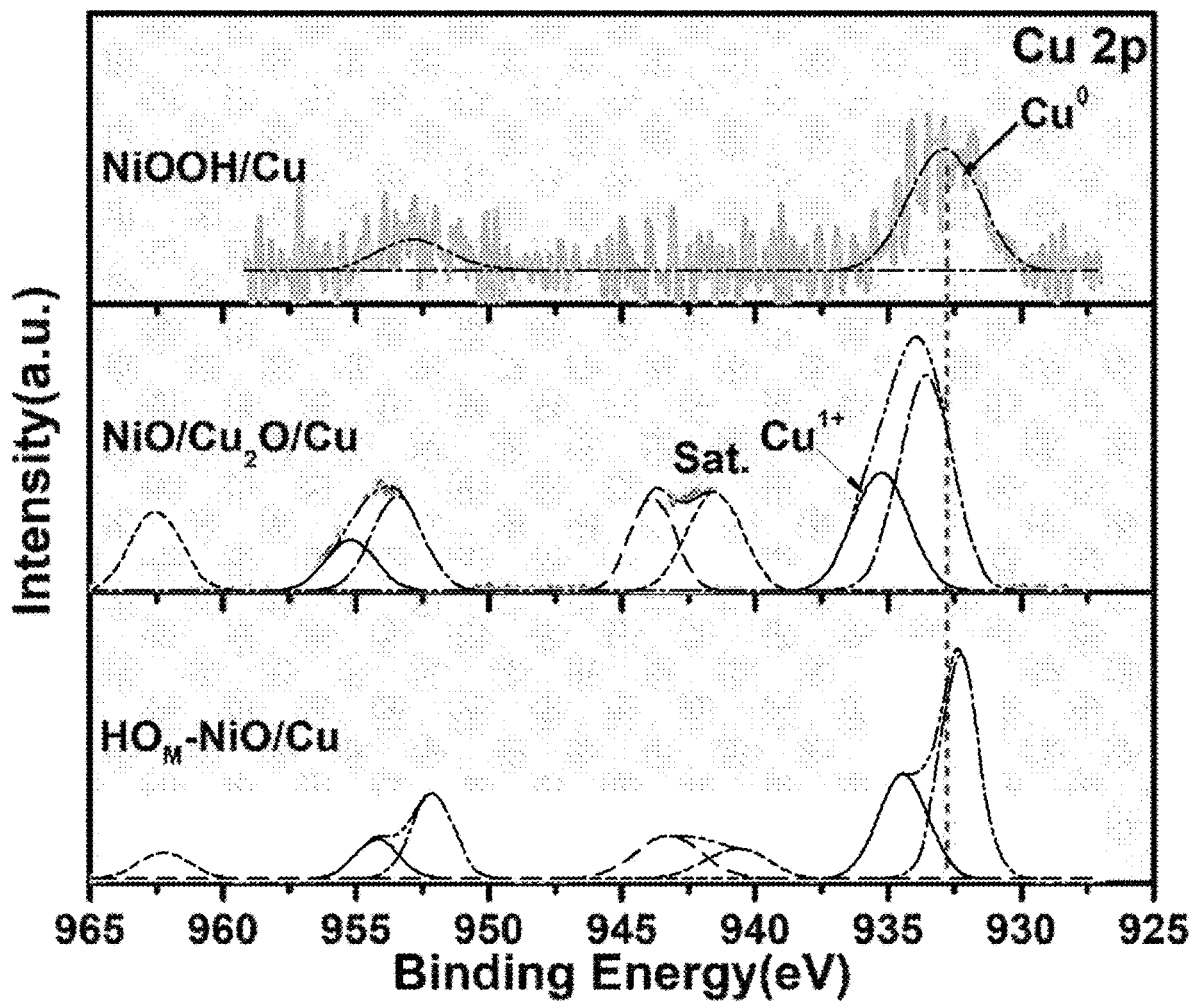
Figure 2F:
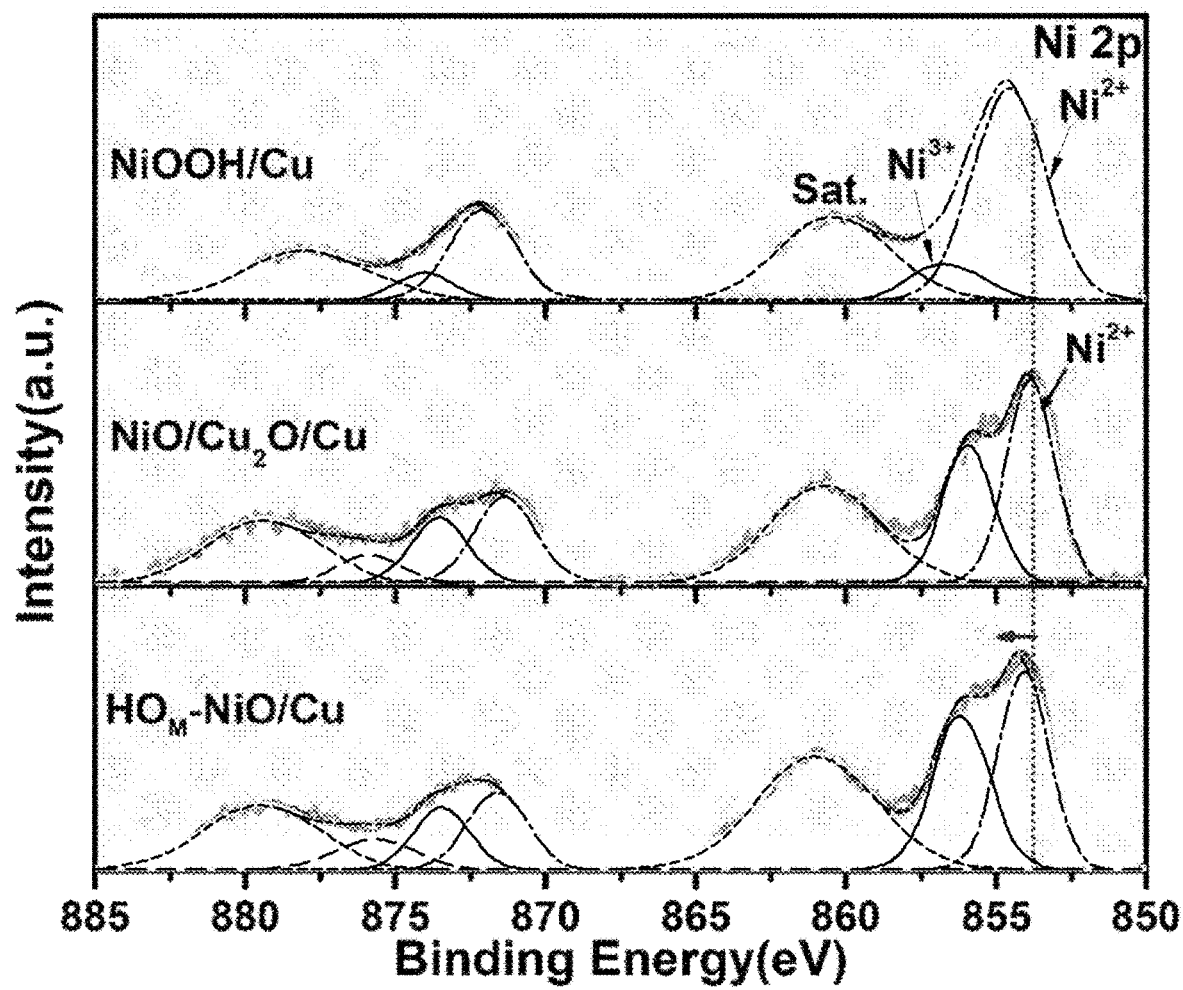
Figure 2G:
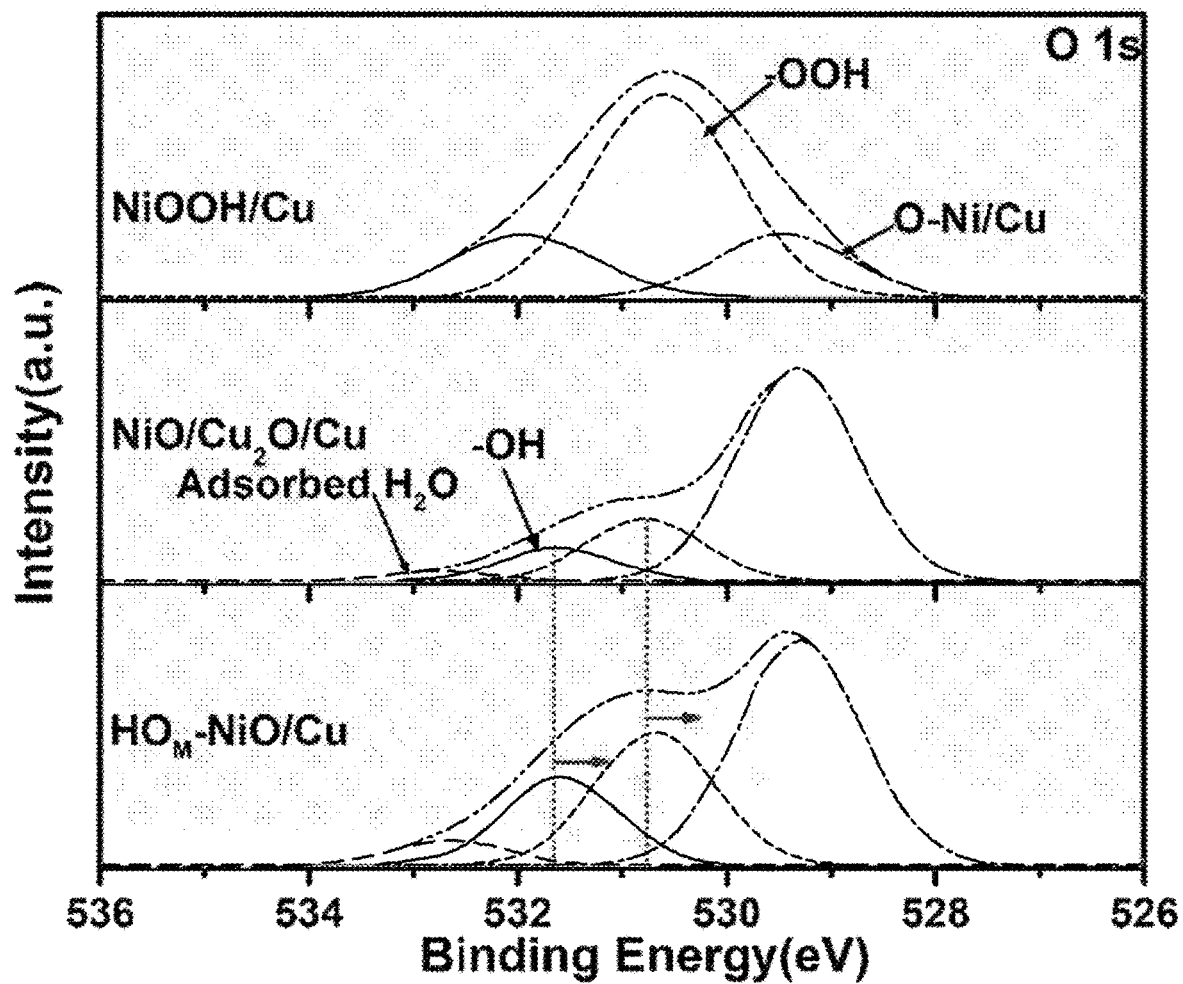

FIG. 2E to FIG. 2G are respectively graphs showing a high-resolution XPS signal of Cu 2p (FIG. 2E), Ni 2p (FIG. 2F) and O 1s (FIG. 2G) of NiOOH/Cu, NiO/Cu$_2$O/Cu, and HO$_M$—NiO/Cu as obtained from an Ar etching condition.

Thus, it was identified based on the X-ray photoelectron spectroscopy (XPS) of the Cu 2p obtained from the Ar gas etching that the major surface component was remarkably converted into Cu (O) with low binding energy (FIG. 2E). This indicates the electronic interaction of copper and NiO on the heterojunction interface.

All Ni 2p spectra exhibited substantial oxide properties, and distinct different properties of binding energy were identified in NiOOH/Cu. Further, this shows the positive shift of lattice oxygen towards higher binding energy after activation. The positive shift of $Ni^{2+}$ toward higher binding energy after activation (FIG. 2F) indicates that electrons at the Ni site are withdrawn due to adsorption of extra $OH^-$.

This is the same phenomenon as that observed in single-atom catalysts functionalized with hydroxyl groups. Visible enrichment of —OOH and —OH-containing species in O 1s XPS (FIG. 2G) further confirms the reliability of adsorption of the exogenous hydroxyl group to the Ni center.

Figure 2H:
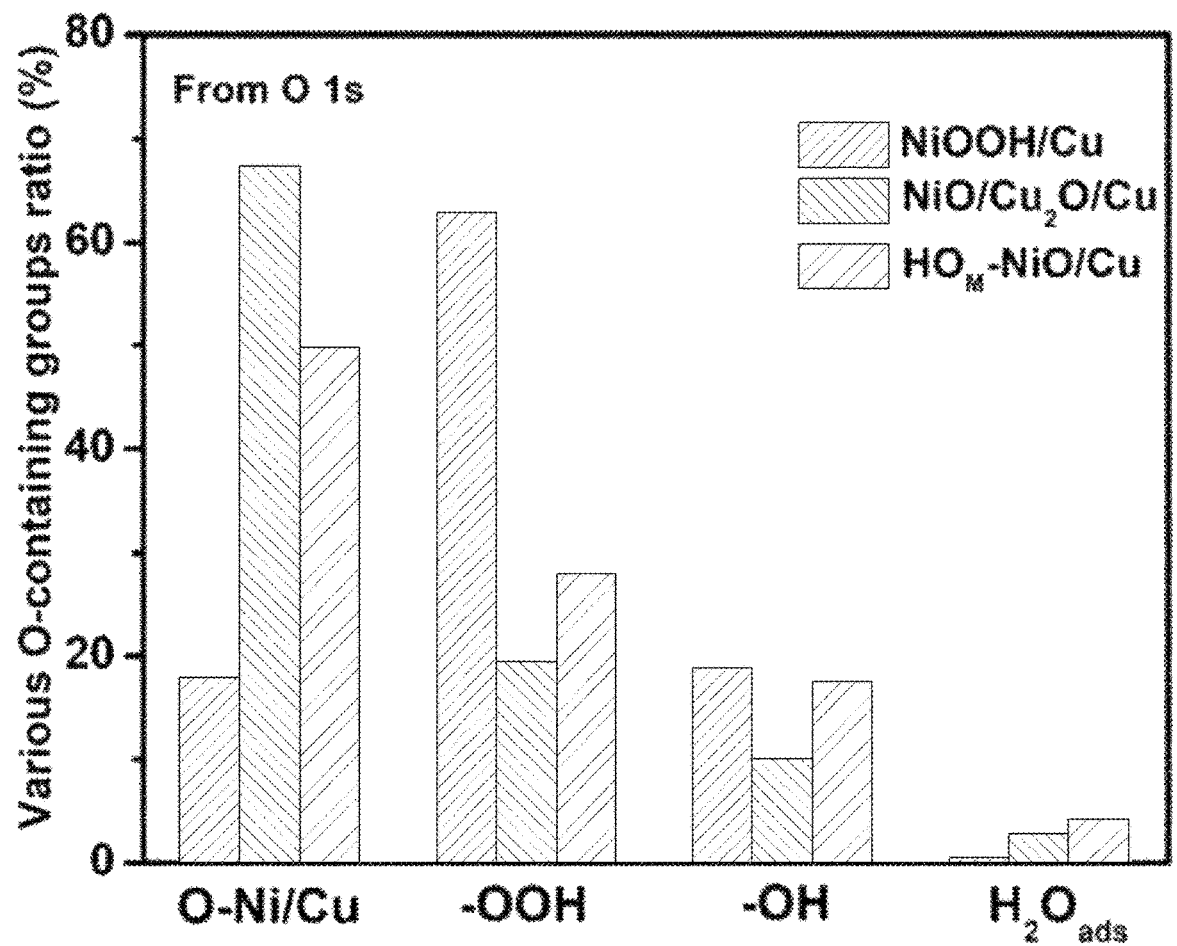
Figure 21:
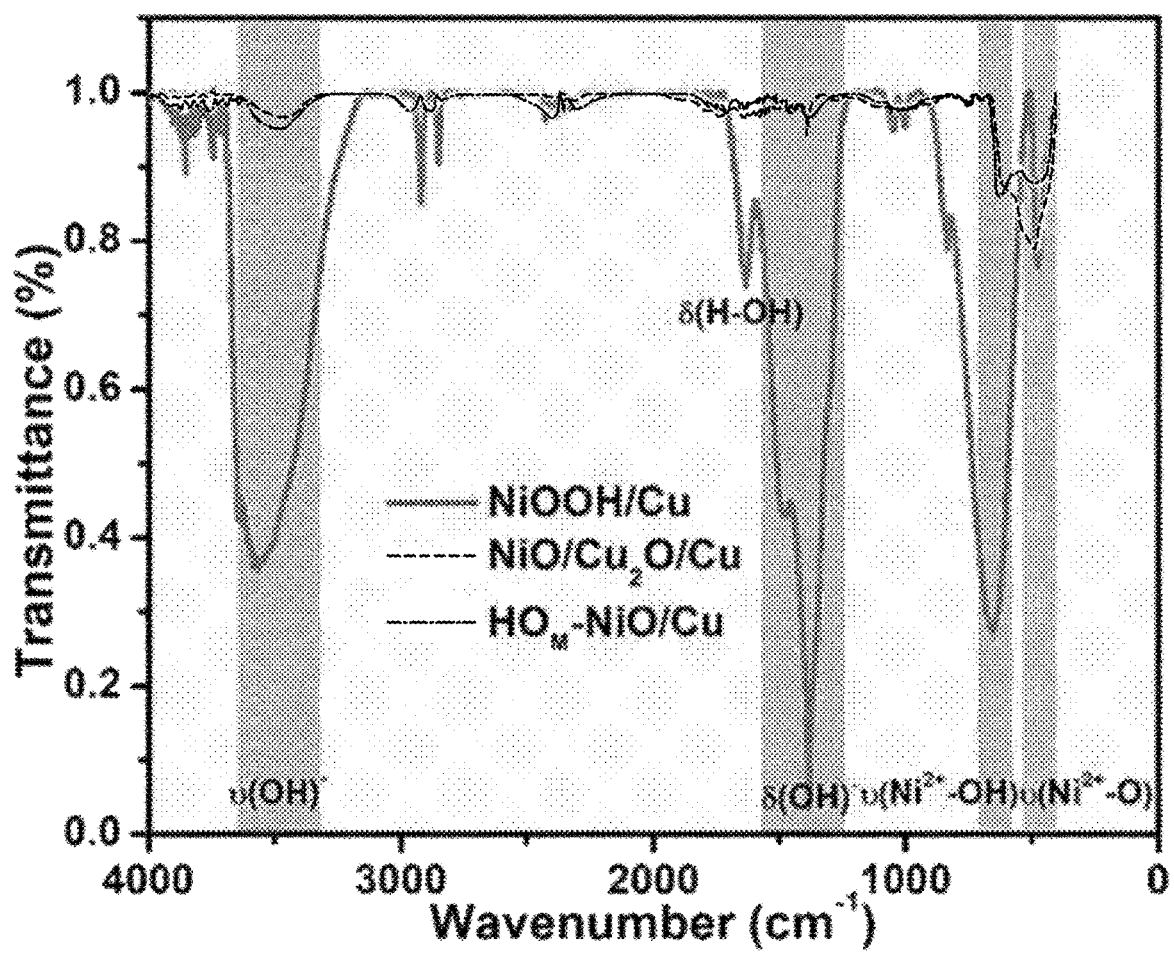

FIG. 2H is a graph showing a corresponding ratio of various O-containing groups in an O 1s XPS signal.

The absence and explosion of —OOH and —OH in O 1s XPS before and after hydroxylation further confirm the reliability of adsorption of the exogenous hydroxyl group to the Ni center.

FIG. 2I is a graph showing the FT-IR spectra of NiOOH/Cu, $NiO/Cu_2O/Cu$, and $HO_M$—NiO/Cu.

Thus, the appearance of $Ni^{2+}$—OH oscillations in the Fourier transform infrared spectrum (FT-IR) of $HO_M$—NiO/Cu may further confirm the reliability of the adsorption of exogenous $OH^-$ to the Ni center.

Thus, NiO may have similar properties to those of Ni-oxyhydroxide which is known to have desired water dissociation ability, and may protect from the catalytic 'poison' of $OH^-$ (weakened oxygen affinity) due to the lack of electrons and thus may continuously absorb reactive $H_2O$.

FIGS. 3A-3E are graphs showing an XRD spectrum of the catalyst for the hydrogen evolution reaction (HER) according to an embodiment of the present disclosure.

Specifically, an effect of electrolyte KOH concentration on the $OH^-$ modification was investigated.

Figure 3A:
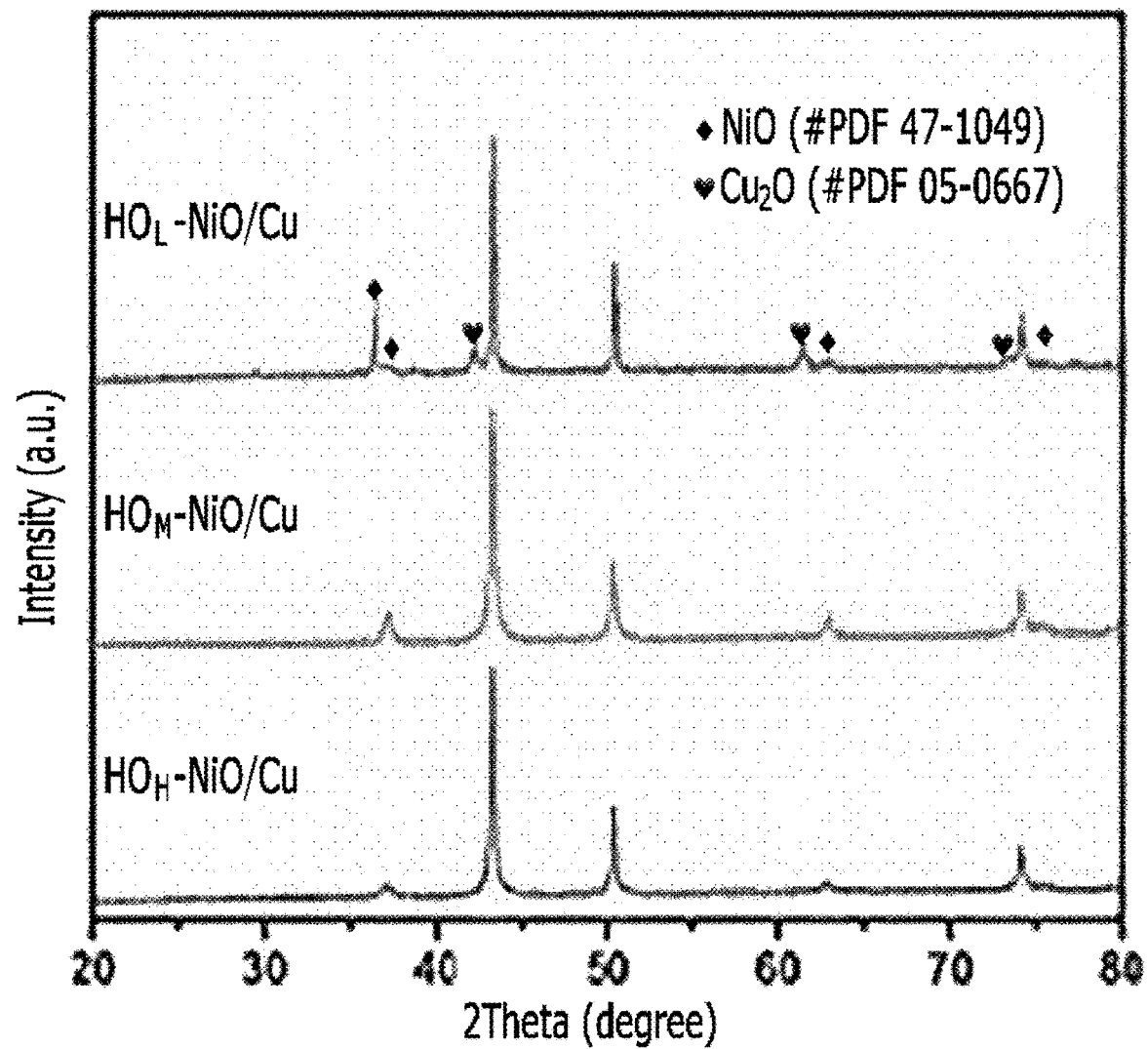
FIGS. 3A-3E are graphs showing an XRD spectrum of the catalyst for the hydrogen evolution reaction (HER) according to an embodiment of the present disclosure.
Figure 3B:
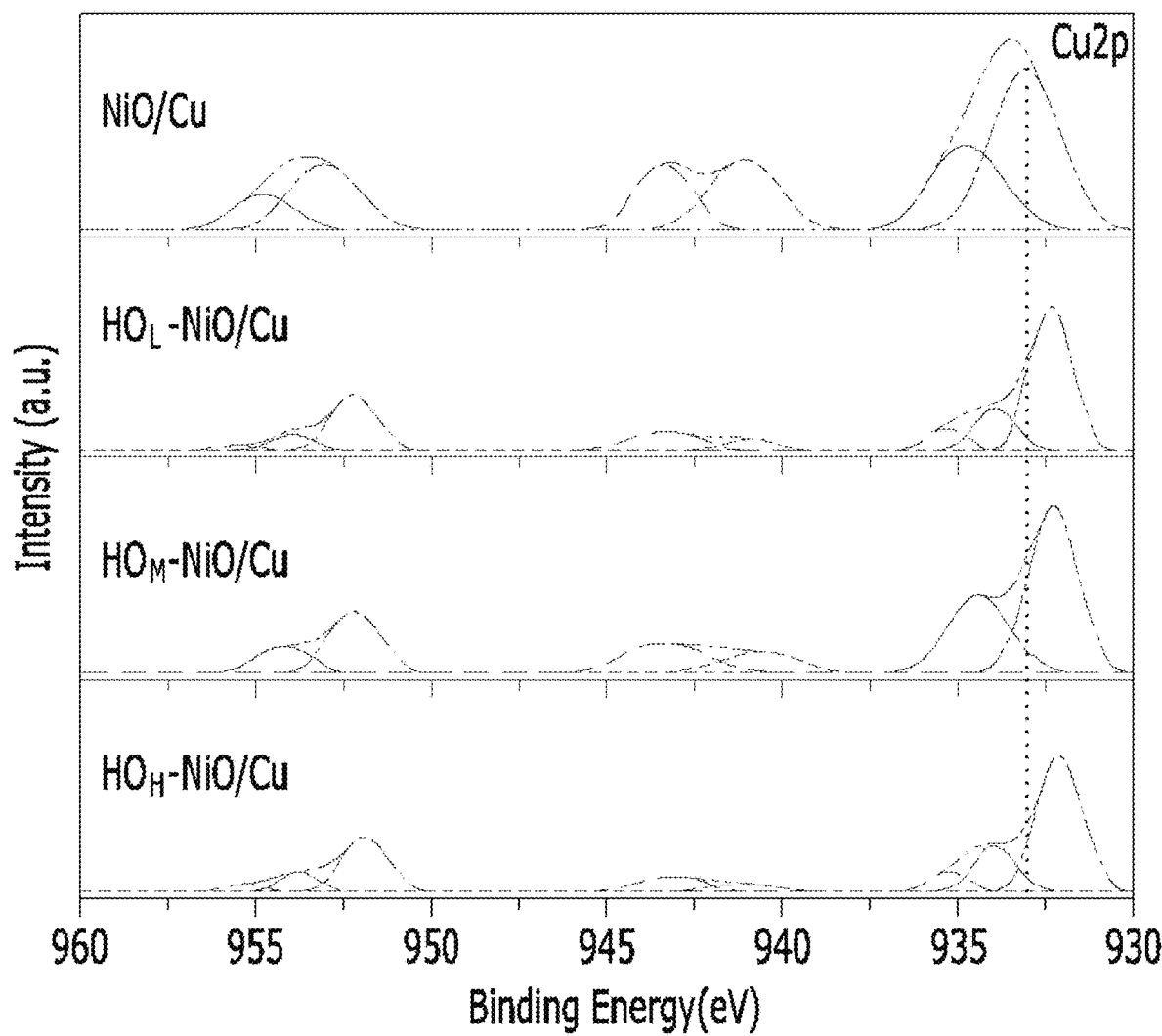
Figure 3C:
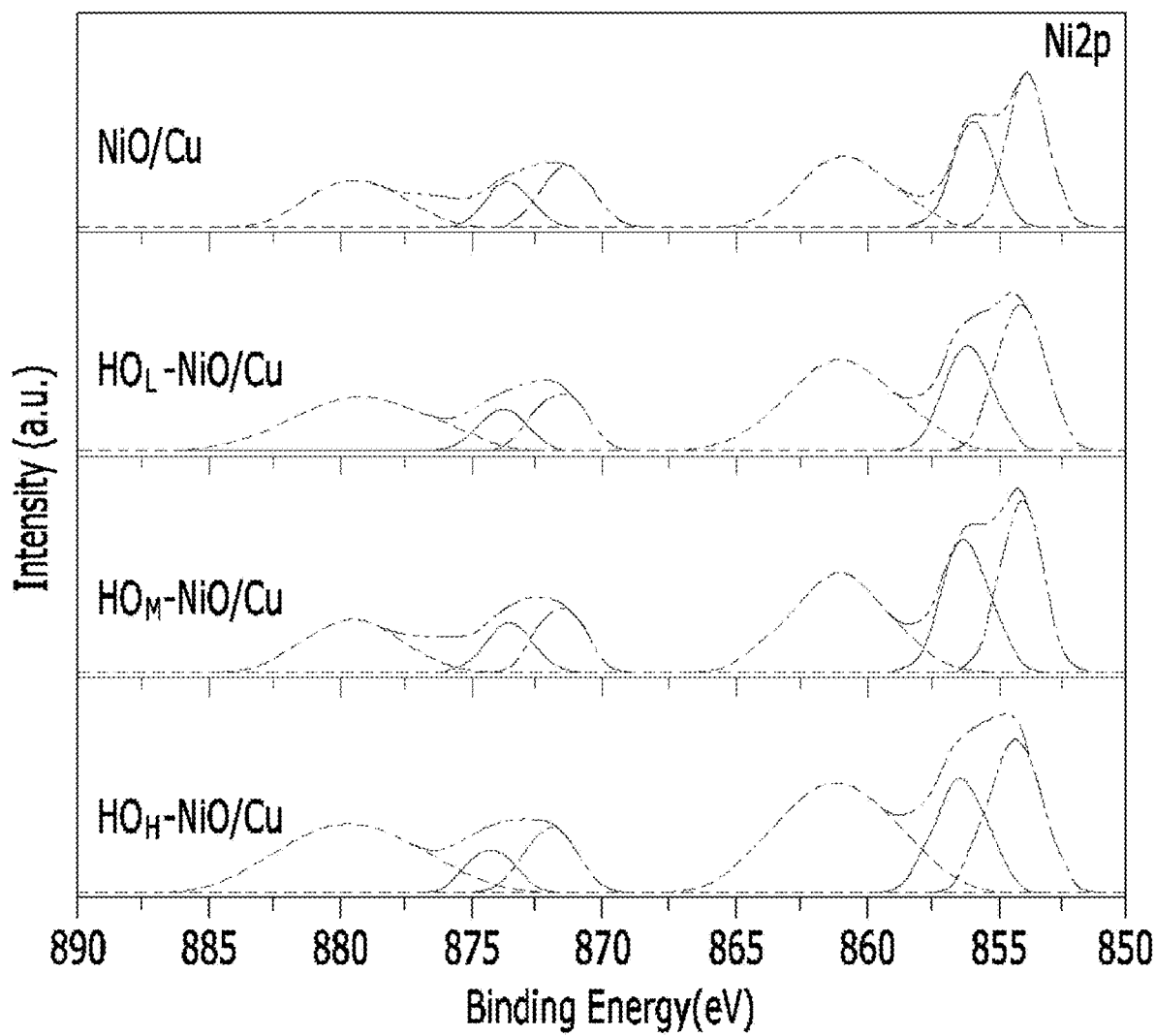
Figure 3D:
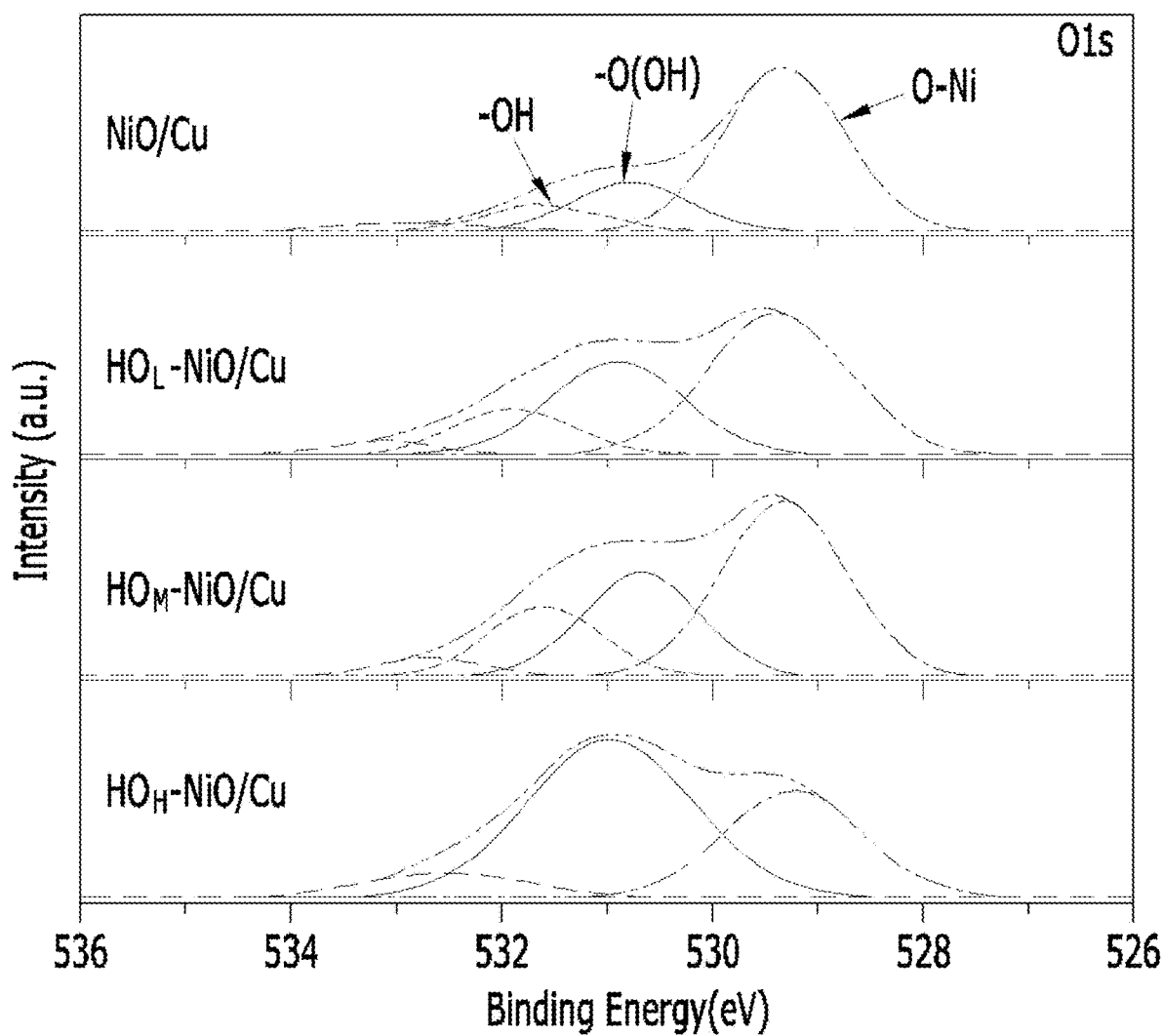

FIG. 3A is an XRD spectrum showing the difference between catalysts, FIG. 3B to FIG. 3D are respectively graphs showing a high-resolution XPS signal of Cu 2p (FIG. 3B), Ni 2p (FIG. 3C) and O 1s (FIG. 3D) of $HO_L$—NiO/Cu, $HO_M$—NiO/Cu, $HO_H$—NiO/Cu.

Thus, it was identified that $HO_L$—NiO/Cu retained a large proportion of $Cu_2O$ and had a chemical state of NiO almost identical to that of the original NiO, thus suggesting that it is not a predicted model.

It was identified that for $HO_H$—NiO/Cu, an increase in the hydroxyl ratio was observed and intact metallic Cu was present in the sample, but the $OH^-$ coverage was too high to expose the abundant active NiO sites for reaction.

Figure 3E:
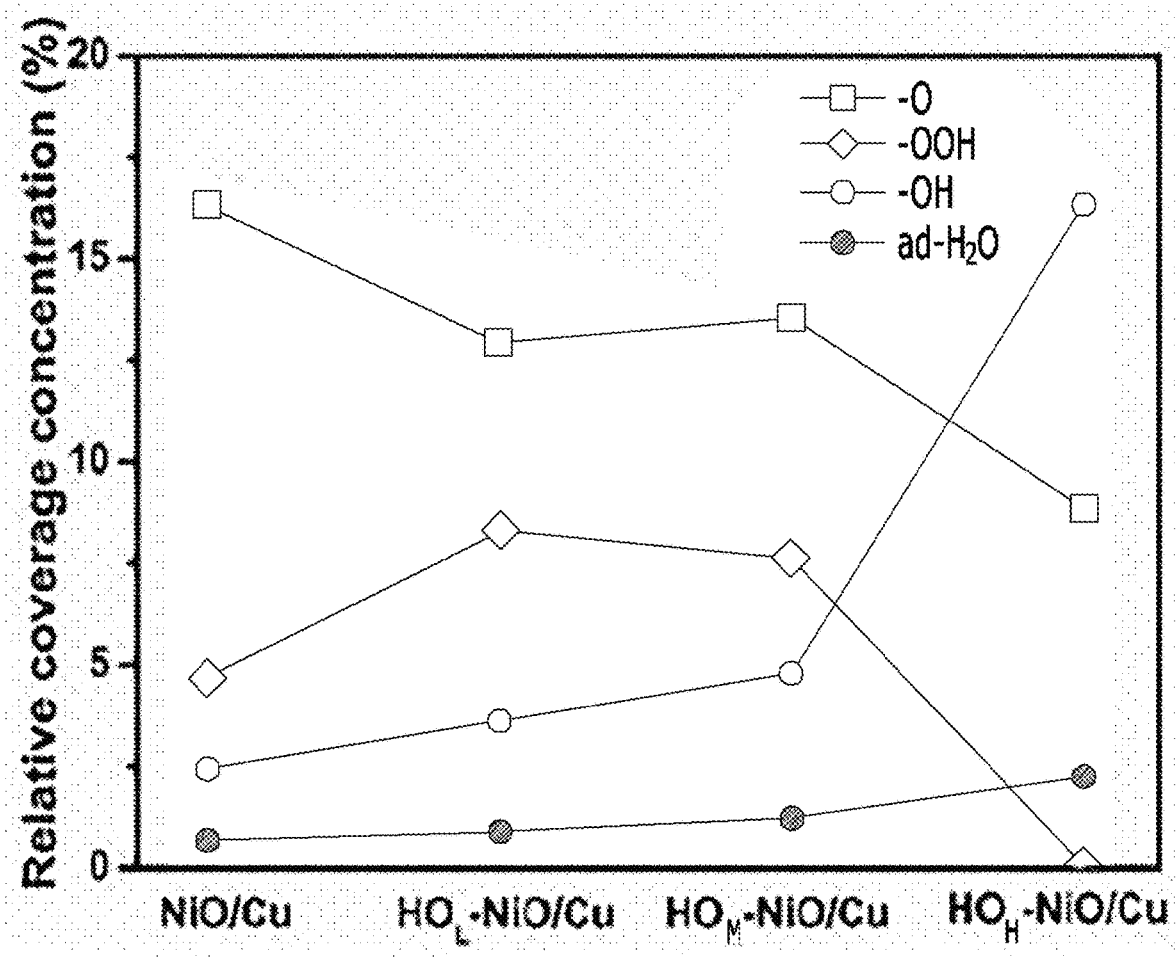

FIG. 3E refers to relative coverages of various $O^-$ containing groups on the catalyst surface as obtained from the O1s XPS data.

Based on O1 of XPS, a relative coverage concentration of $OH^-$ on each NiO/Cu surface may be calculated. The $OH^-$ coverage increased from 2.5% of NiO/Cu to 16% of $HO_H$—NiO/Cu. Thus, the reliability of the electrochemical strategy and dependence on electrolyte (KOH) concentration were demonstrated.

Experimental Example 3

FIGS. 4A-4I are graphs showing results of analyzing a chemical state of a second transition metal to which a hydroxyl group is introduced in the catalyst for hydrogen evolution reaction (HER) according to an embodiment of the present disclosure.

Specifically, in order to identify the chemical state of $OH^-$ modified Ni, XANES (X-ray absorption energy near-edge structure) spectroscopy was additionally performed.

Figure 4A:
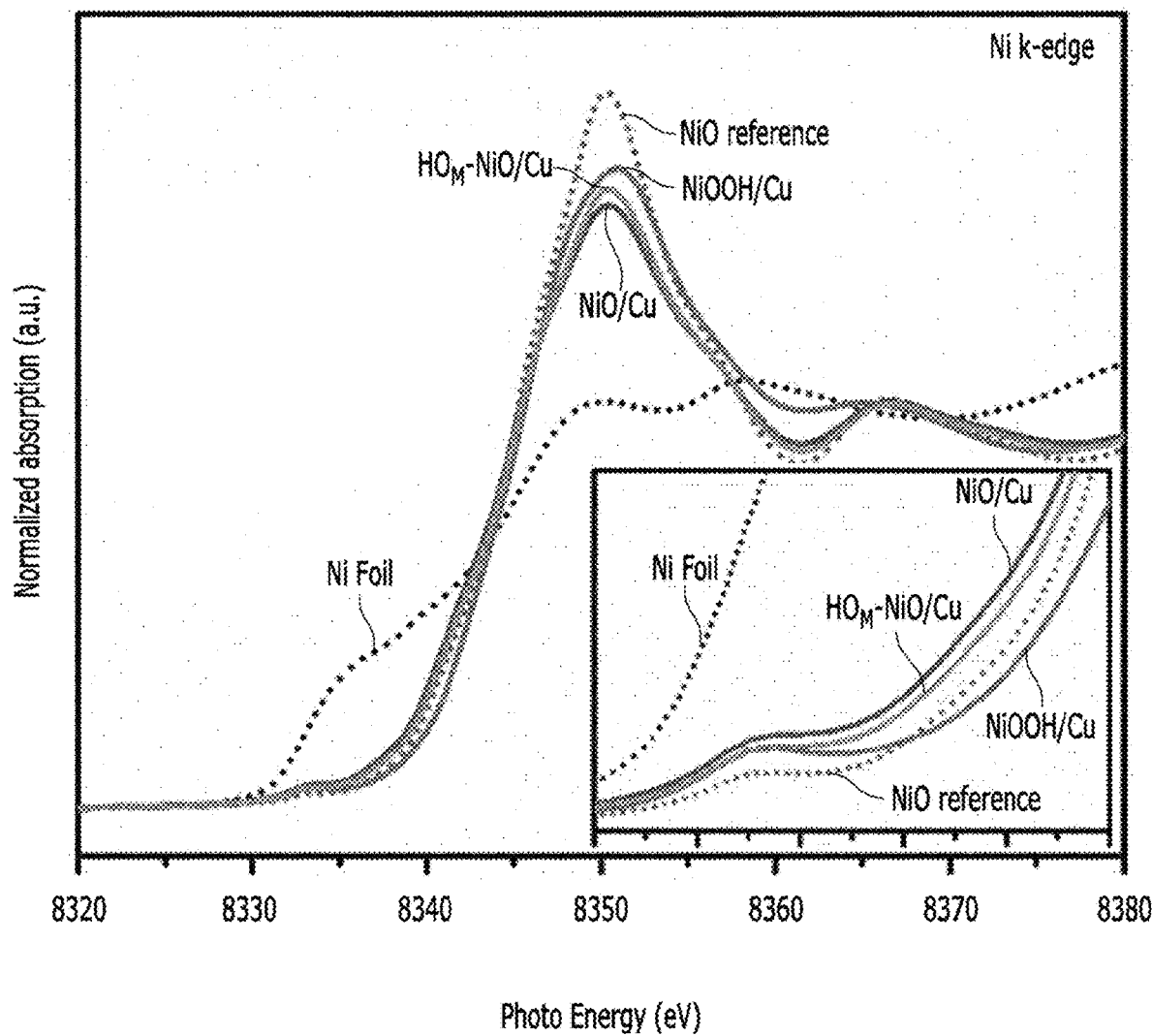
FIGS. 4A-4I are graphs showing results of analyzing a chemical state of a second transition metal to which a hydroxyl group is introduced in the catalyst for hydrogen evolution reaction (HER) according to an embodiment of the present disclosure.

FIG. 4A is the near-edge X-ray absorption spectrum (XANES).

Thus, the typical adsorption ability of Ni in NiO was identified. For NiO/Cu, the absorption edge shows higher energy thereof than that of standard NiO. This means that the oxidation state is greater than +2 due to the unique heterojunction interface with Cu. Once the electrochemical adjustment is made, pre-edge adsorption of Ni in $HO_M$—NiO/Cu leads to positive shift. This is because the $OH^-$ group withdraws electrons from the Ni metal center and thus, hydroxylation increases the valence state of Ni (greater than +2). This is consistent with the Ni 2p XPS result.

We recorded Ni-edge X-ray absorption spectra (XANES) spectra for all catalysts. For NiO/Cu, the absorption edge was positioned to lower energy than a standard level. That is, the oxidation state is smaller than +2 because of the presence of an intrinsic heterogeneous interface with Cu. After the electrochemical activation process, the pre-edge adsorption of Ni in $HO_M$—NiO/Cu has a positive migration but is still present on the left of the NiO reference. This indicates that the electrochemical strategy increases the valence state of Ni but the state increases to a value equal to or smaller than +2 because the $OH^-$ group withdraws electrons from the Ni metal center.

Figure 4B:
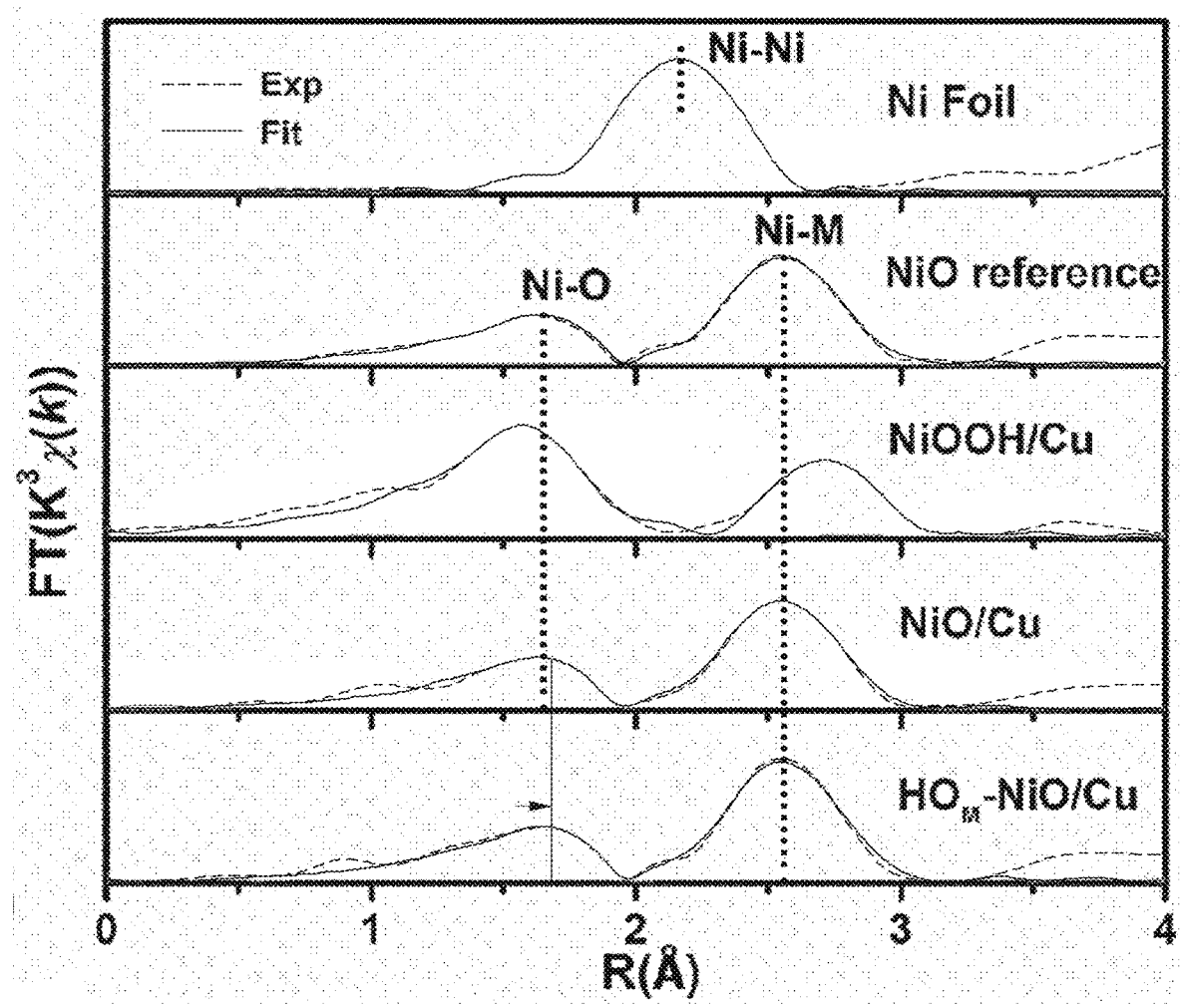
Figure 4C:
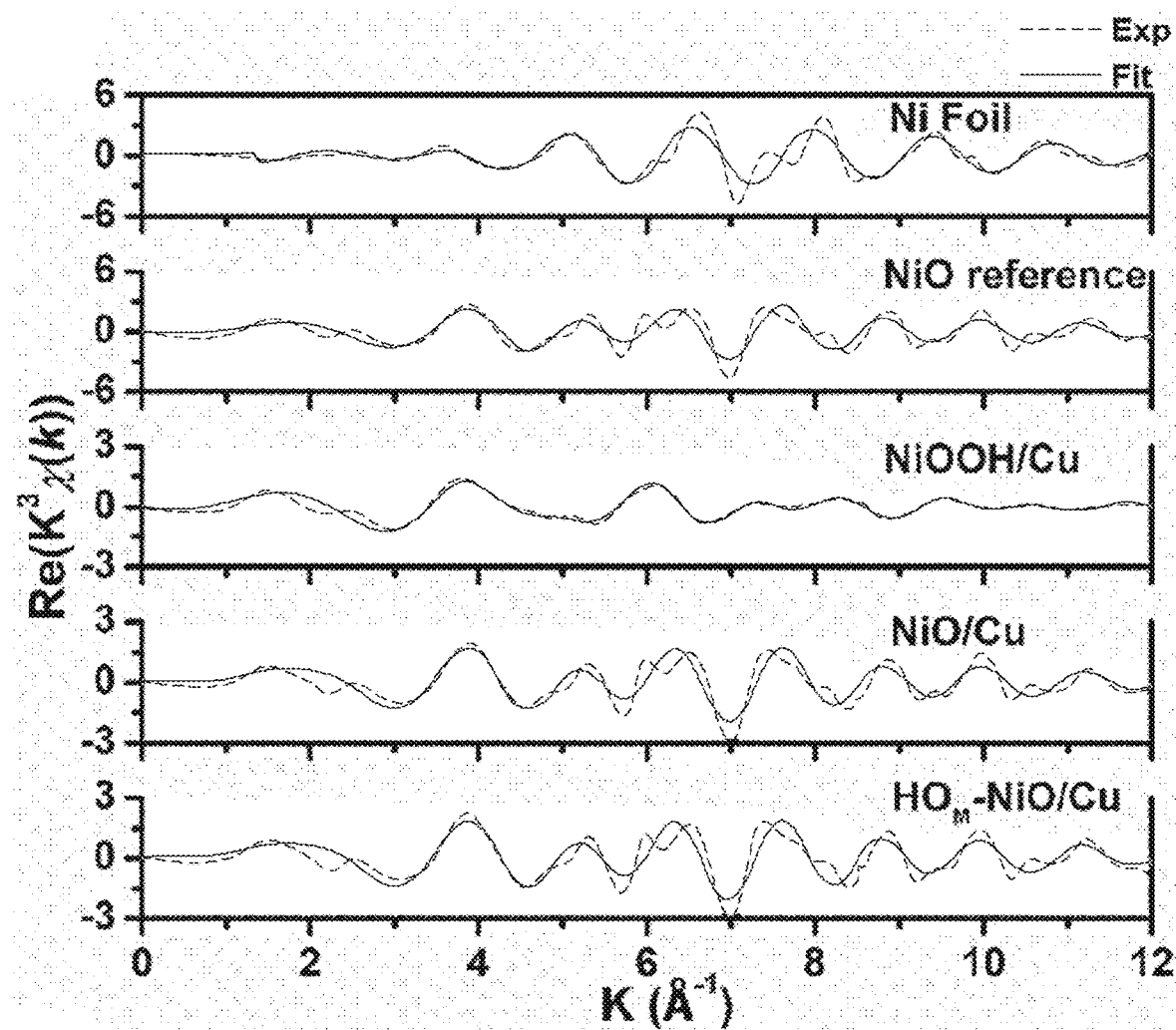
Figure 4D:
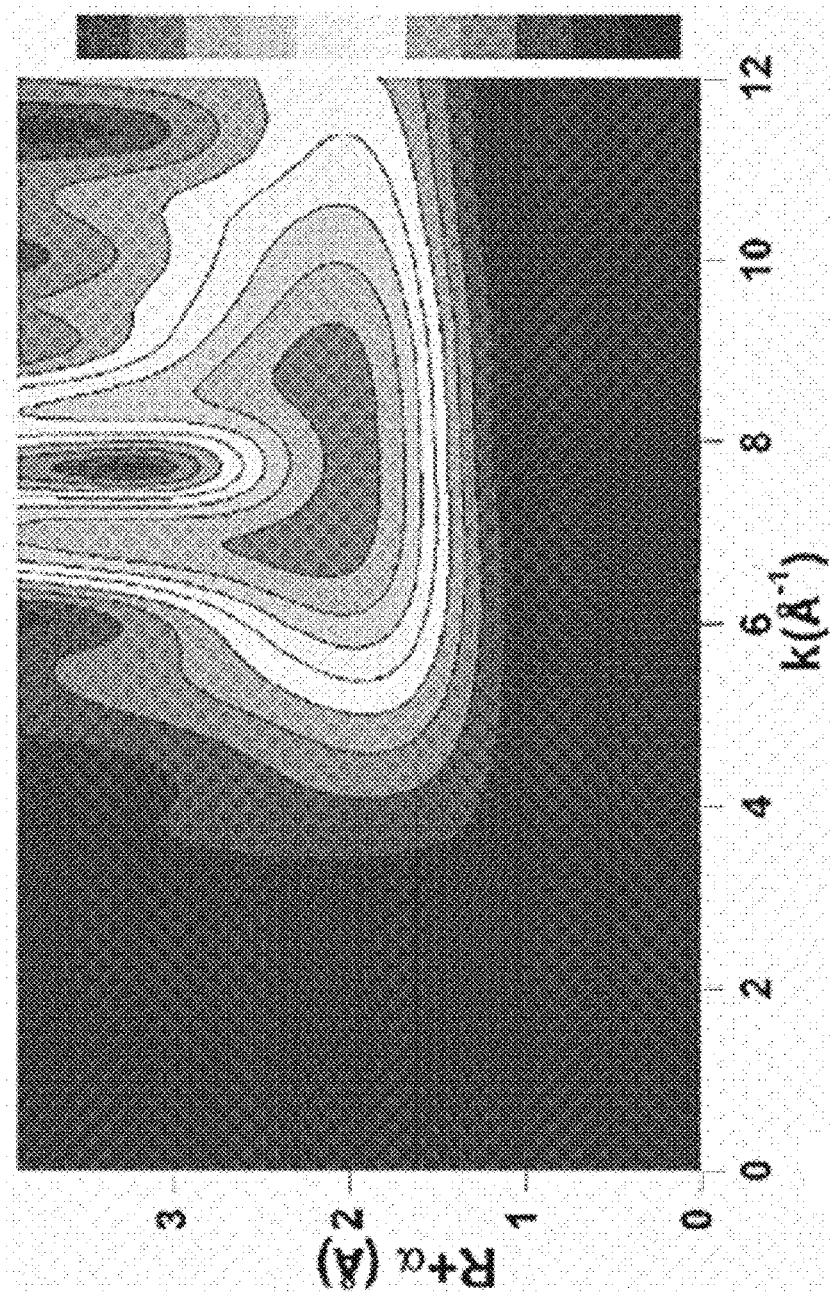
Figure 4E:
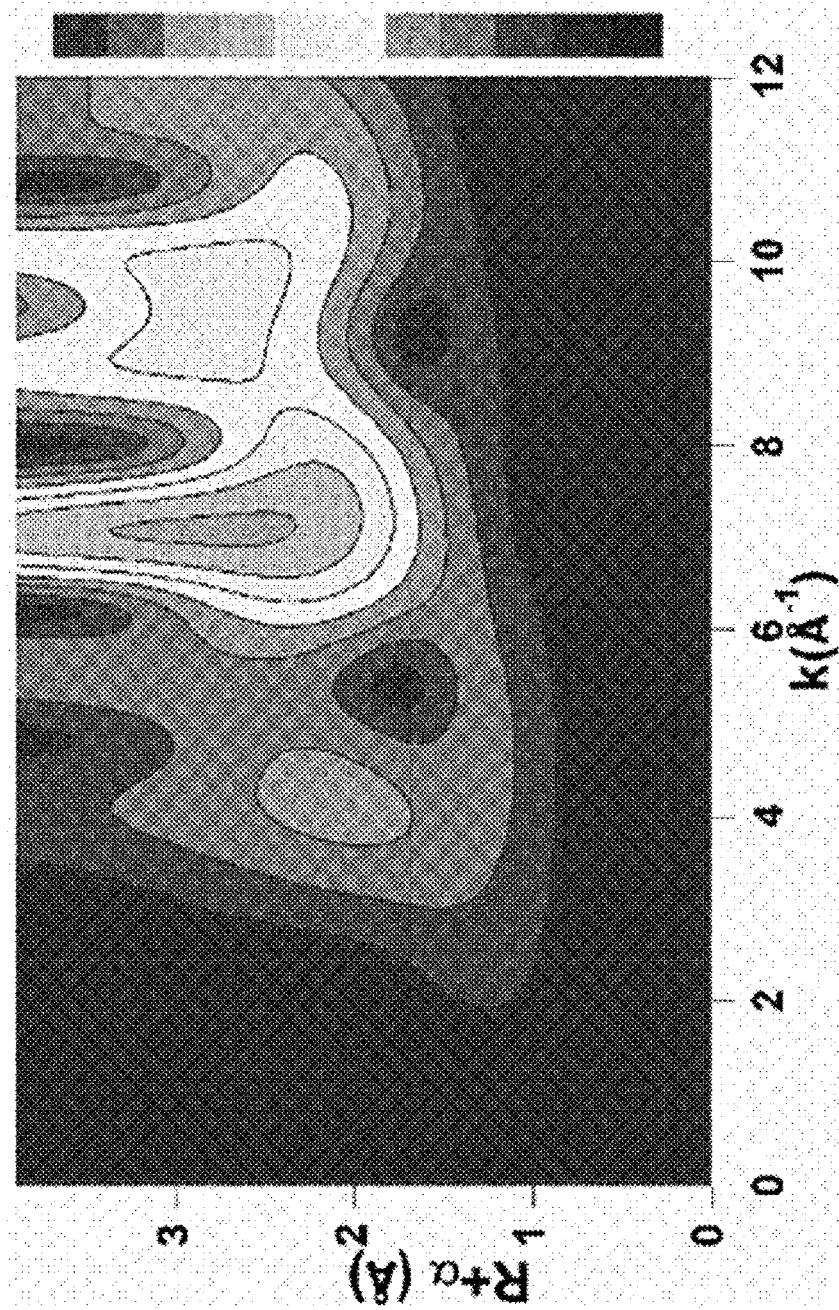
Figure 4F:
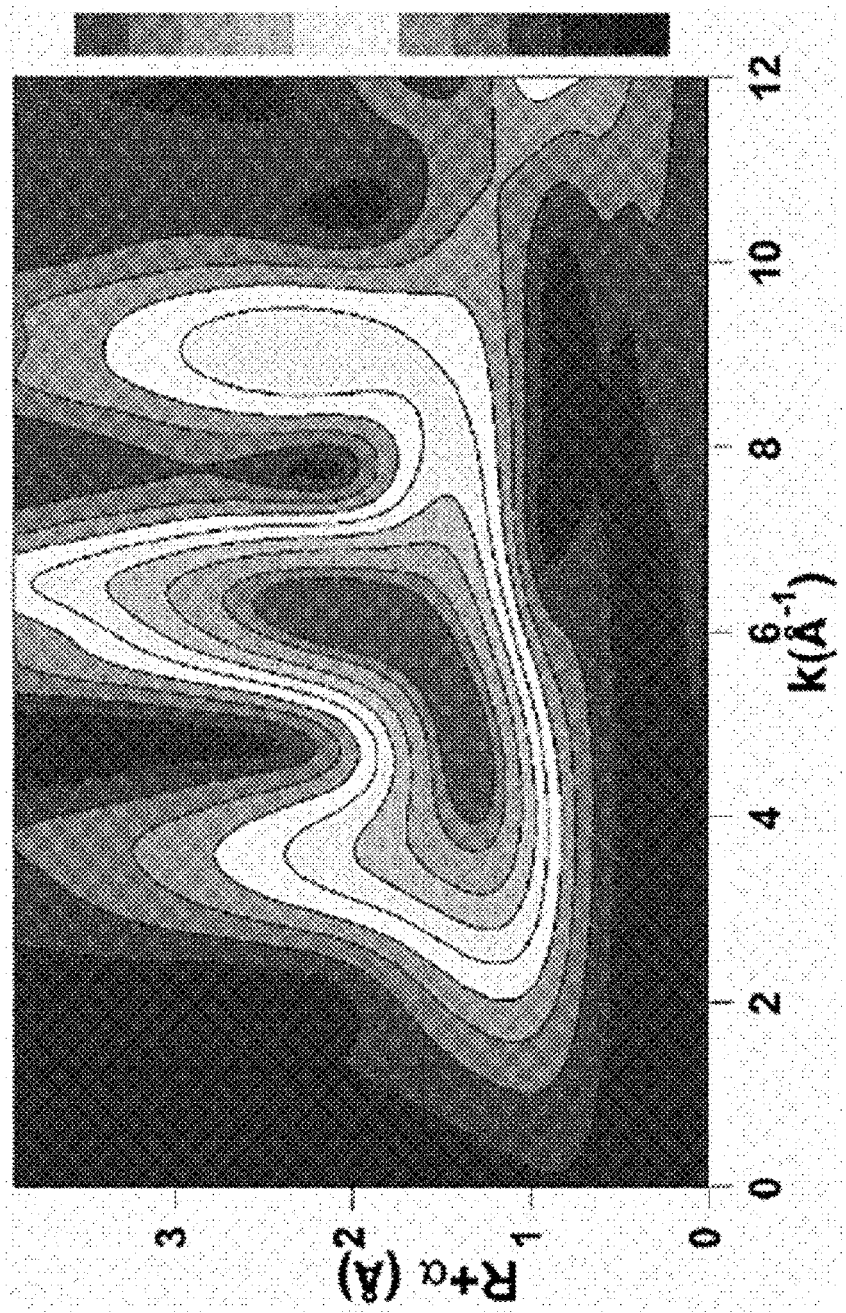
Figure 4G:
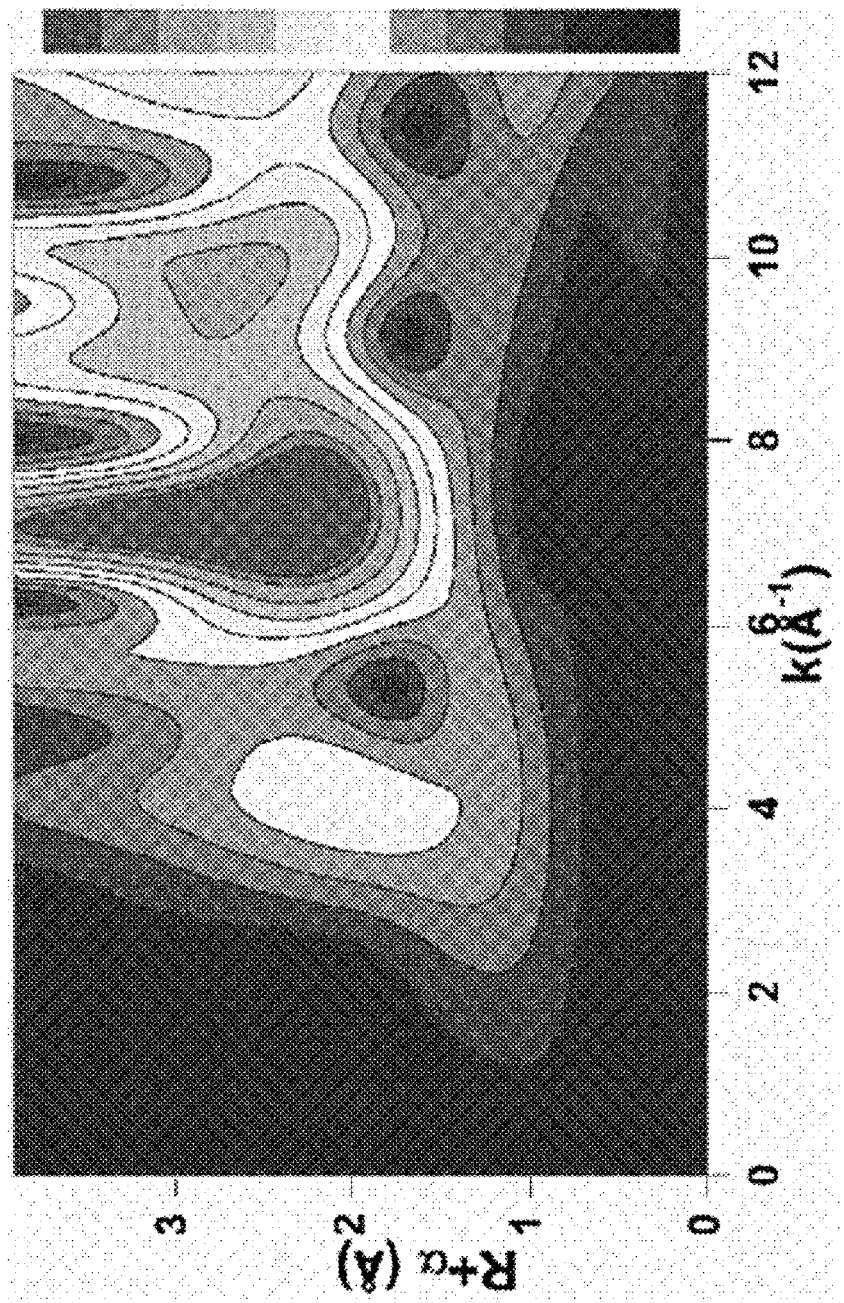

FIG. 4B is the EXAFS Fourier transform (FT-EXAFS) spectrum, and FIG. 4C is the fitting path of the catalyst using Ni foil and standard NiO spectra as reference.

The tuning environment is described with the Fourier transform of the extended X-ray absorption microstructure (EXAFS), the corresponding fitting path, and the wavelet transform of the EXAFS (WT-EXAFS). All NiO samples exhibit the presence of Ni on the oxide as evidenced by two predominant peaks at 1.6 and 2.5 A attributed to Ni—O and Ni-M (Ni, Cu). An appreciable elongation of the average binding length of Ni—O appears after hydroxylation, thus suggesting that the external $OH^-$ mitigates the local interaction.

Least squares EXAFS curve fitting analysis for the first coordination shell of Ni identifies two backscatter paths: Ni—O (2.08 Å) and Ni-M (2.95 Å).

Figure 4H:
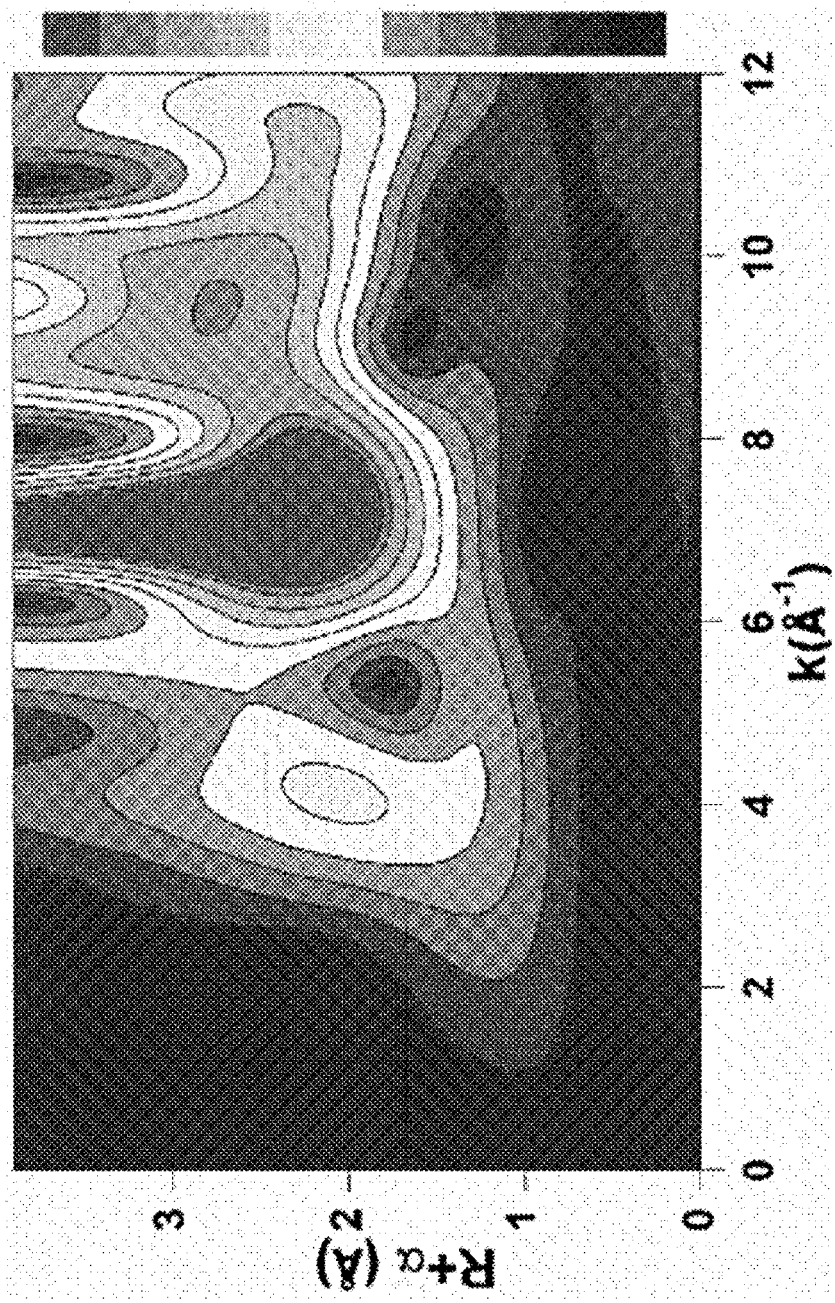

FIG. 4D to FIG. 4H respectively show the wavelet transform (WT-EXAFS) of EXAFS of nickel in nickel foil (FIG. 4D), NiO reference (FIG. 4E), NiOOH/Cu (FIG. 4F), NiO/Cu (FIG. 4G), and $HO_M$—NiO/Cu (FIG. 4H).

The increase in the coordination number (CN) of Ni in Ni—O and Ni-M bonds to each of 5.6 and 12.3 for NiO/Cu and to 6.0 and 13.6 for $HO_M$—NiO/Cu appears after hydroxylation. The existence of the exogenous $OH^-$ and the heterogeneous interface between NiO—Cu may be distinctly distinguished from NiOOH/Cu. Similar results were also found for wavelet transform analysis of EXAFS (WT-EXAFS) of Ni K-edge data. Especially, similar results were identified for wavelet transforms having slightly more intense Ni—O (4 $Å^{-1}$) and Ni—Ni (Cu) (7 $Å^{-1}$ and 10 $Å^{-1}$) scattering in the $HO_M$—NiO/Cu contour map compared to that of NiO/Cu.

Figure 4I:
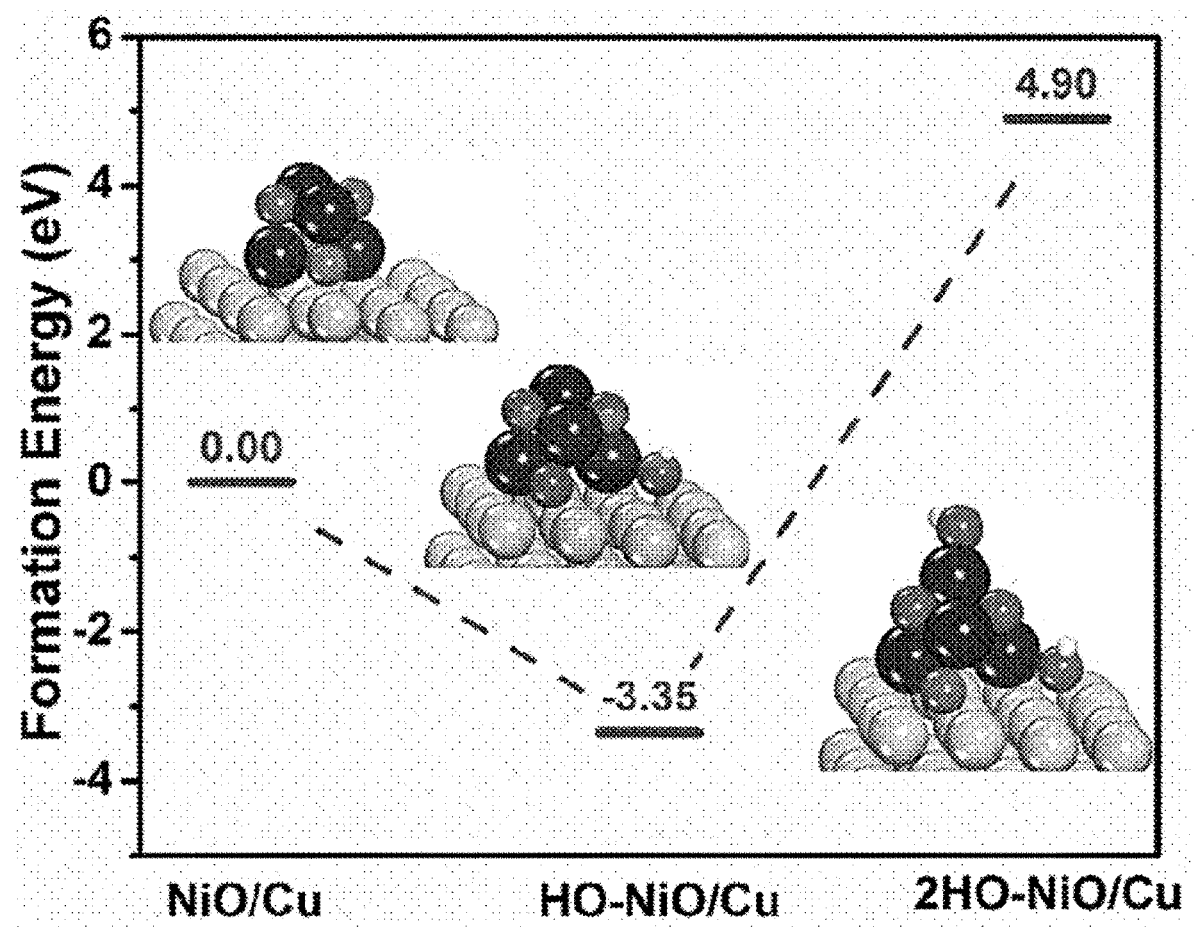

FIG. 4I represents the calculated formation energies of HO—NiO/Cu and 2HO—NiO/Cu based on NiO/Cu and a corresponding surface structure.

Thus, due to the theoretical verification of the $OH^-$ modification on NiO/Cu, the first $OH^-$ formation energy is negative. This is evidence that one $OH^-$ is favorably attached to the NiO/Cu surface. Since the two $OH^-$ adsorption acts as a very positive energy barrier, one $OH^-$ modification should be optimally provided.

Experimental Example 4

FIGS. 5A-5F are graphs showing the results of analyzing the electrical catalyst characteristics of the catalyst for hydrogen evolution reaction (HER) according to an embodiment of the present disclosure.

Figure 5A:
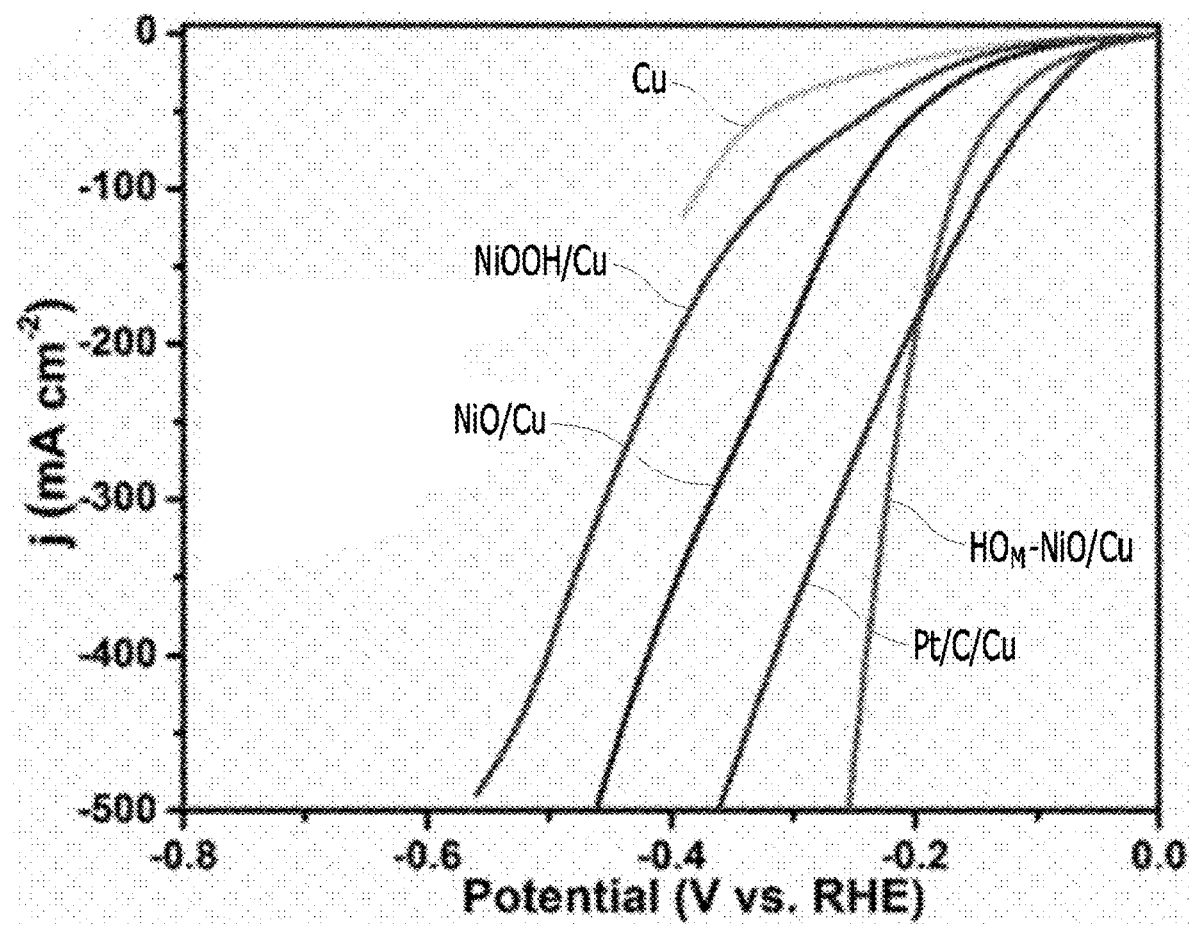
FIGS. 5A-5F are graphs showing results of analyzing electrical catalyst characteristics of the catalyst for hydrogen evolution reaction (HER) according to an embodiment of the present disclosure.
Figure 5B:
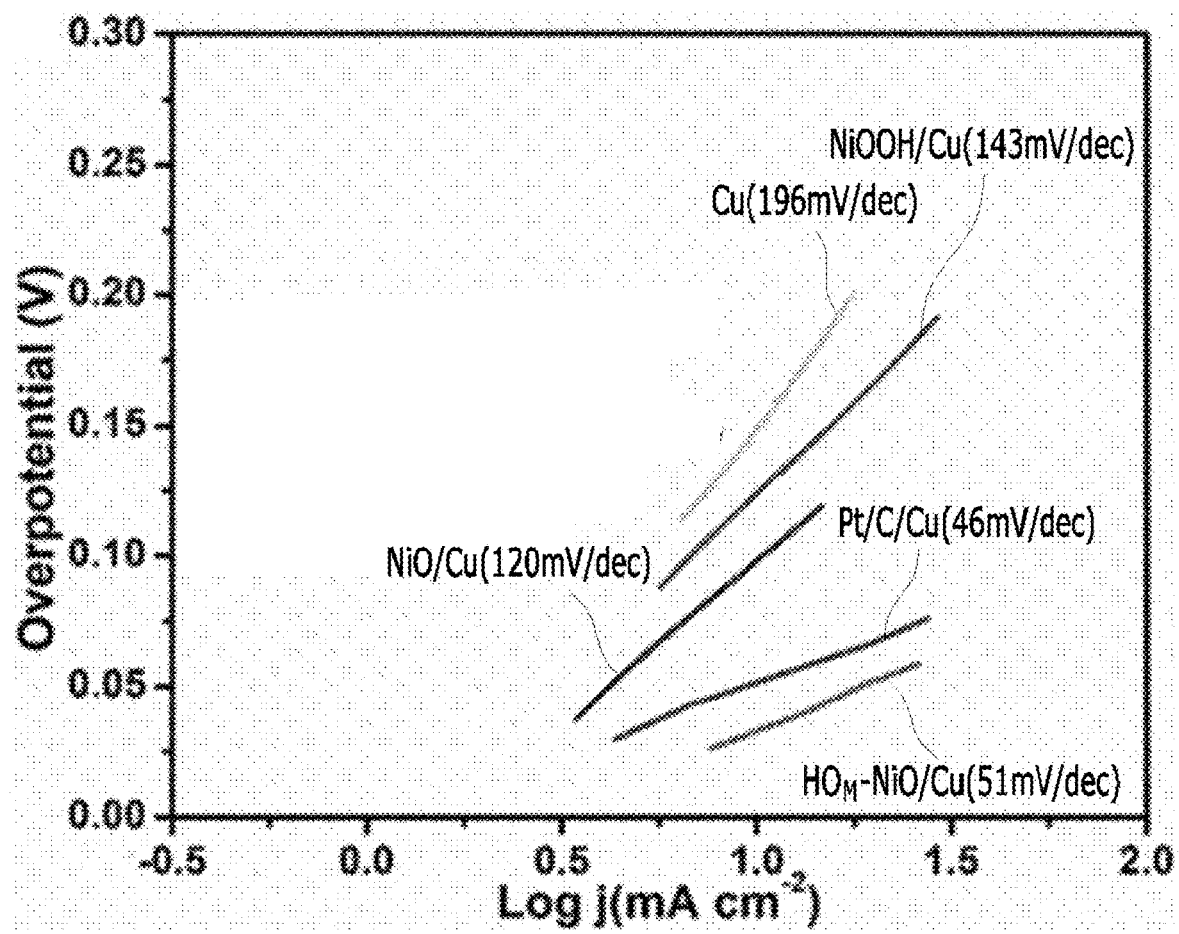

FIG. 5A shows the polarization curve of $HO_M$—NiO/Cu under optimal conditions, and in FIG. 5B shows the corresponding Tafel plot of the catalyst according to the present disclosure.

The HER polarization curve exhibited a significant improvement in the performance of $HO_M$—NiO/Cu, with a smaller overpotential (33 mV) at 10 mA cm$^{-2}$ and a similar Tafel slope (51 mV/dec) to that of Pt/C/Cu (51 mV/dec).

Excellent HER activity at overpotentials of 33 mV and 310 mV at current density 10 mA cm$^{-2}$ and 1000 mA cm$^{-2}$ at 1.0 M KOH which is superior to that of Pt/C is achieved.

This suggests that the introduction of the hydroxyl group and the hetero-interface impart the improved water dissociation rate and fast hydrogen evolution properties to NiO at the same time.

Figure 5C:
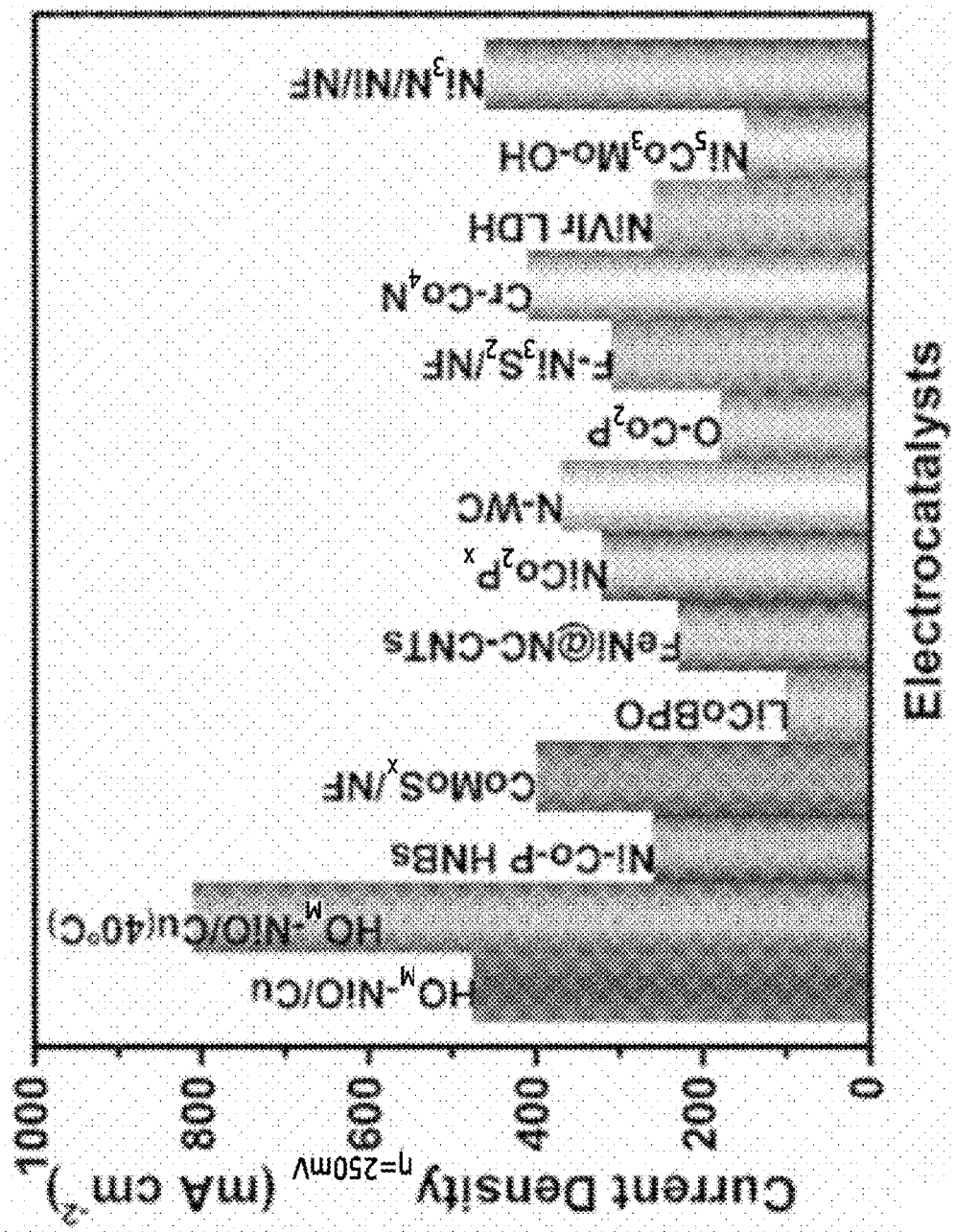

FIG. 5C shows the comparison of current densities at −250 mV of various alkaline electrocatalysts.

Impressively, $HO_M$—NiO/Cu exhibits better activity than that of Pt/C or even outperforms the best Ni-based catalysts reported in alkaline conditions under high overvoltage (250 mV).

Figure 5D:
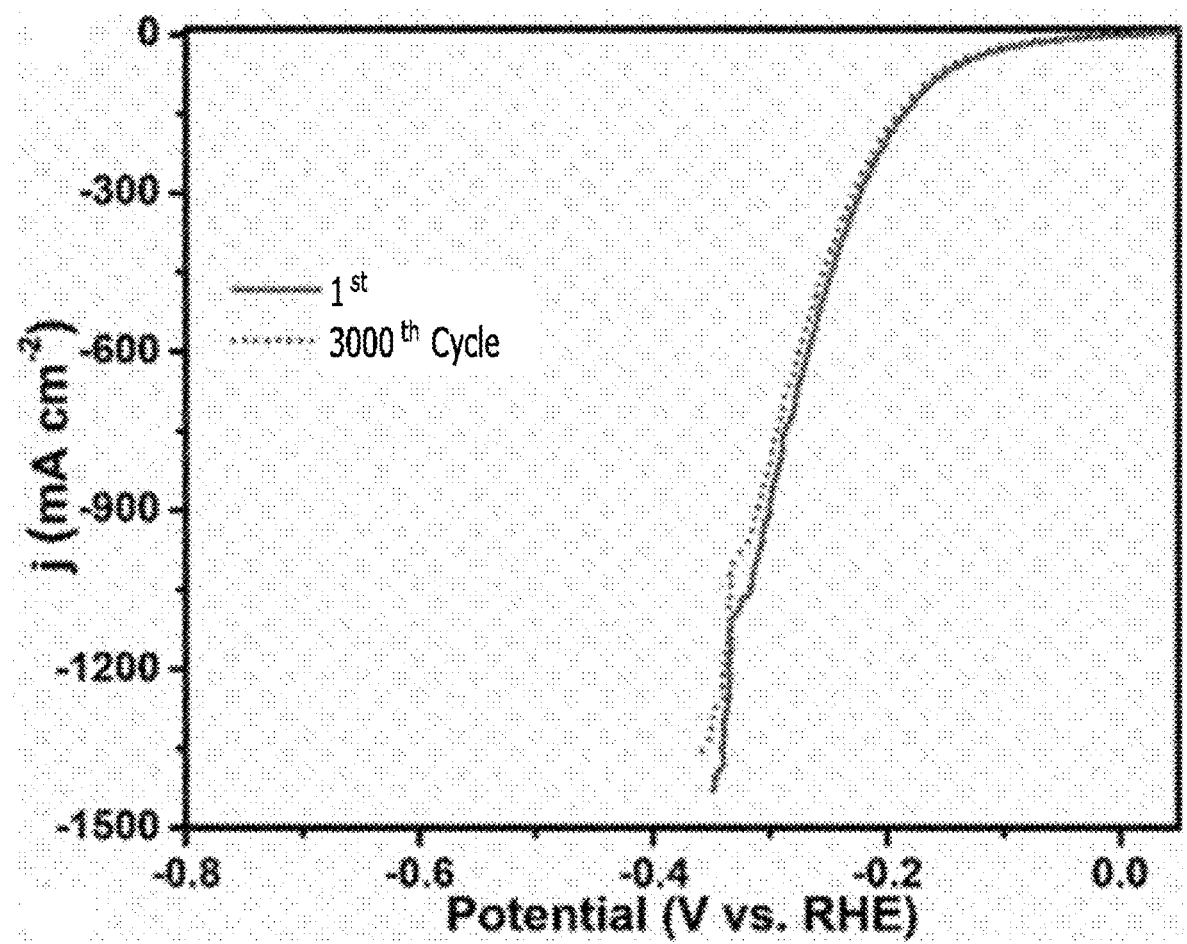

FIG. 5D shows the HER polarization curve of $HO_M$—NiO/Cu before and after 3000 CV cycles.

Thus, it was identified that the polarization curve of $HO_M$—NiO/Cu hardly changed after 3000 cycles. This indicates the stability of $HO_M$—NiO/Cu according to the present disclosure.

Figure 5E:
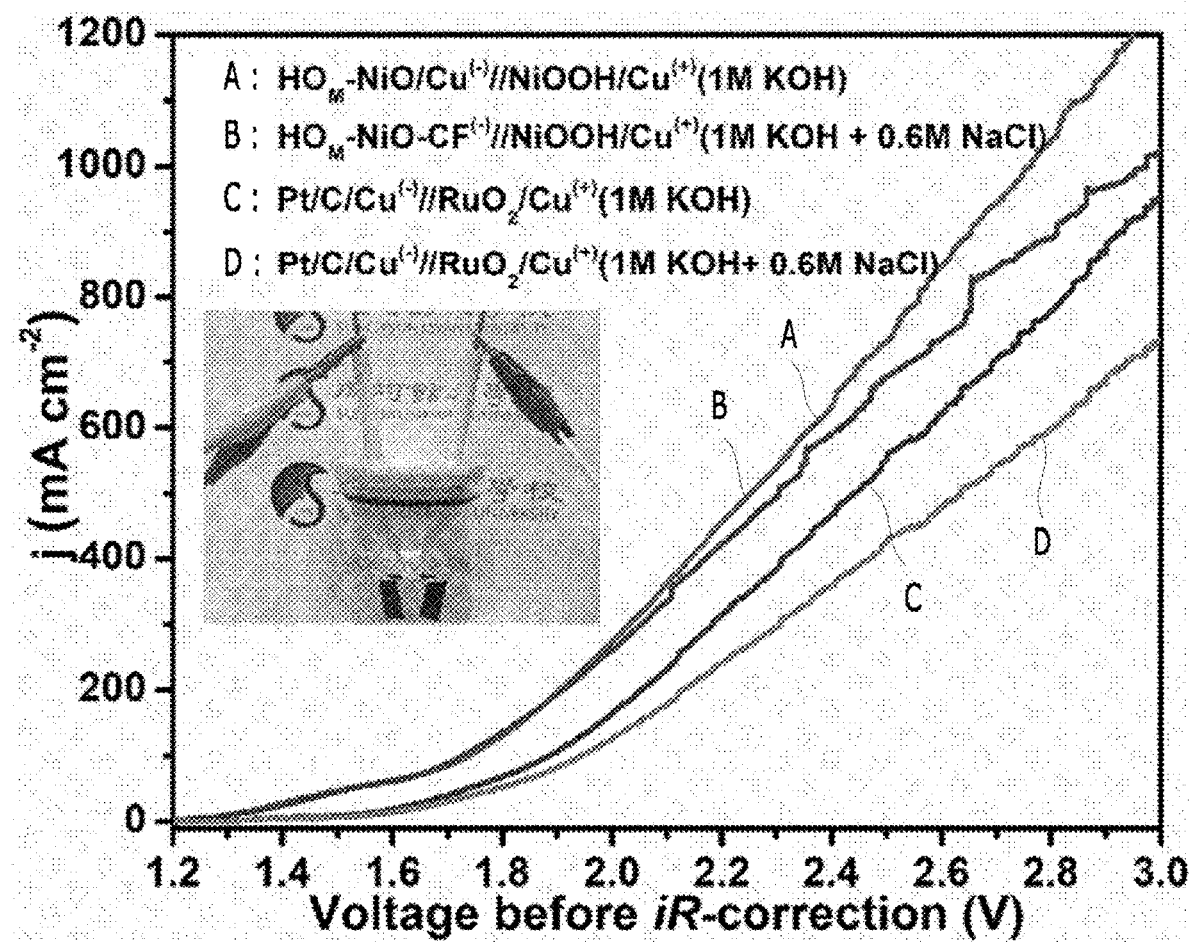
Figure 5F:
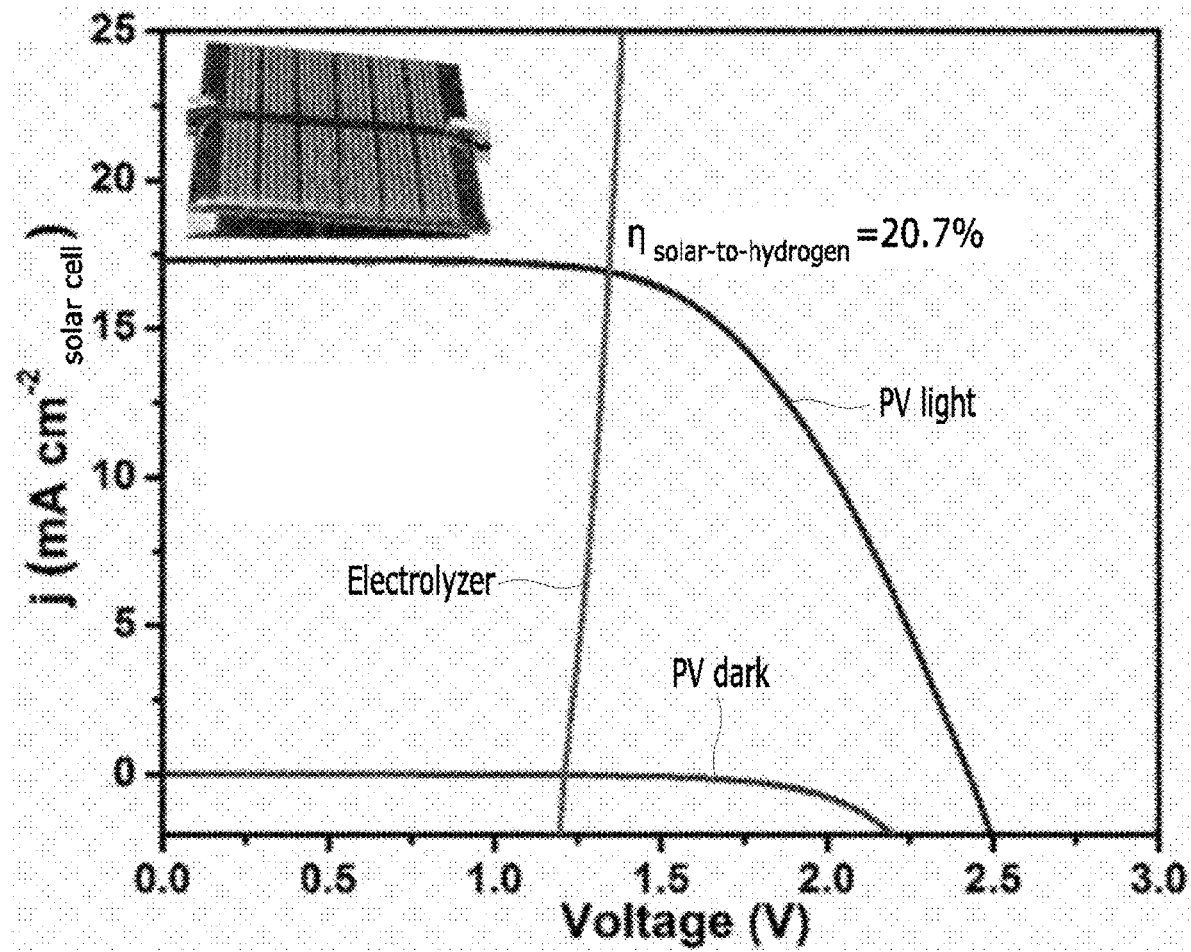

FIG. 5E shows overall water electrolysis linear sweeping voltage-current curves of various electrocatalysts in 1 M KOH and simulated seawater (1 M KOH+0.6 M NaCl) without iR correction. FIG. 5F shows the current density-potential curve (J-V) of a water electrolysis bath and two perovskite tandem cells (inset in FIG. 5F) under dark simulated AM 1.5 G 100 mW*cm$^{-2}$ illumination.

The illuminated surface area of the perovskite cell is a total of 9.24 cm$^{-2}$ and each of the catalyst electrode areas is 1 cm$^{-2}$ (geometrically).

Considering that $HO_M$—NiO/Cu has excellent HER performance and NiOOH/Cu excellent OER performance, the coupling cell of $HO_M$—NiO/Cu (cathode)/NiOOH/Cu (anode electrode) has excellent overall water electrolysis performance (E10=1.5 V in 1.0 M KOH, E10=1.52 V, simulated seawater). Further, it exhibited ultra-high durability at 100 mA and 1000 mA cm$^{-2}$. The performance is superior to that of the benchmark Pt/C/RuO2. In this two electrodes system, it has low potentials of 1.45 V and 1.5 V at 10 mA cm$^{-2}$ and 50 mA cm$^{-2}$, respectively which surpass most reported values. When the electrocatalyst device is connected in series with a perovskite solar cell (total 9.24 cm$^2$) and is illuminated with simulated sunlight, the expected operating current density of the solar cell-electrolyte combination is 16.8 mA cm$^{-2}$. It is defined as an intersection of the solar cell power curve and the water electrolysis bath load curve. An ultra-high solar light hydrogen (STH) efficiency of 20.7% may be achieved at 1 M KOH.

That is, when two perovskite tandem cells were assembled under the sun, high solar-hydrogen efficiencies of up to 20% was achieved. This is the highest ever recorded for a converted metal oxide.

This indicates that the catalysts according to the present disclosure have great potential to be used for clean energy conversion from seawater and even wastewater.

Experimental Example 5

Figure 6A:
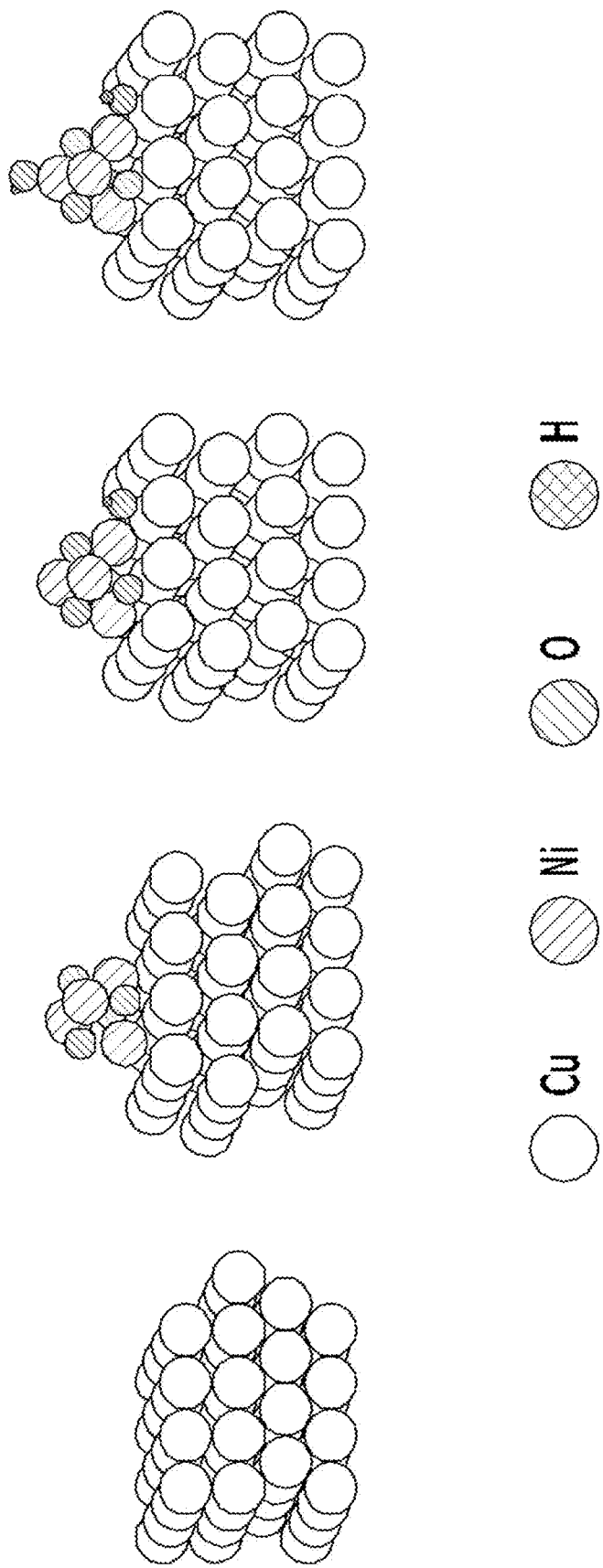
FIGS. 6A-6C are graphs showing theoretical calculation results of an HER activation energy and an electronic structure of a second transition metal component of the catalyst for hydrogen evolution reaction (HER) according to an implementation of the present disclosure.
Figure 6B:
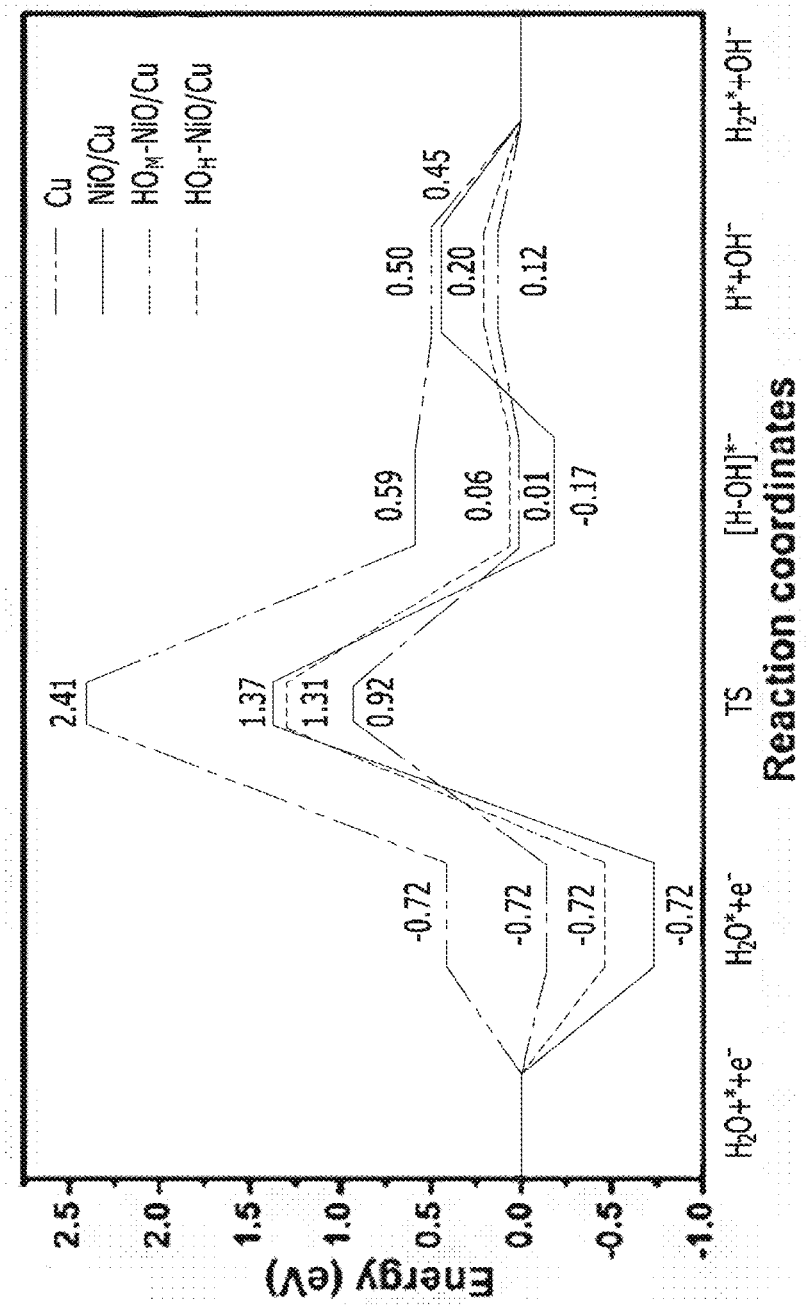
Figure 6C:
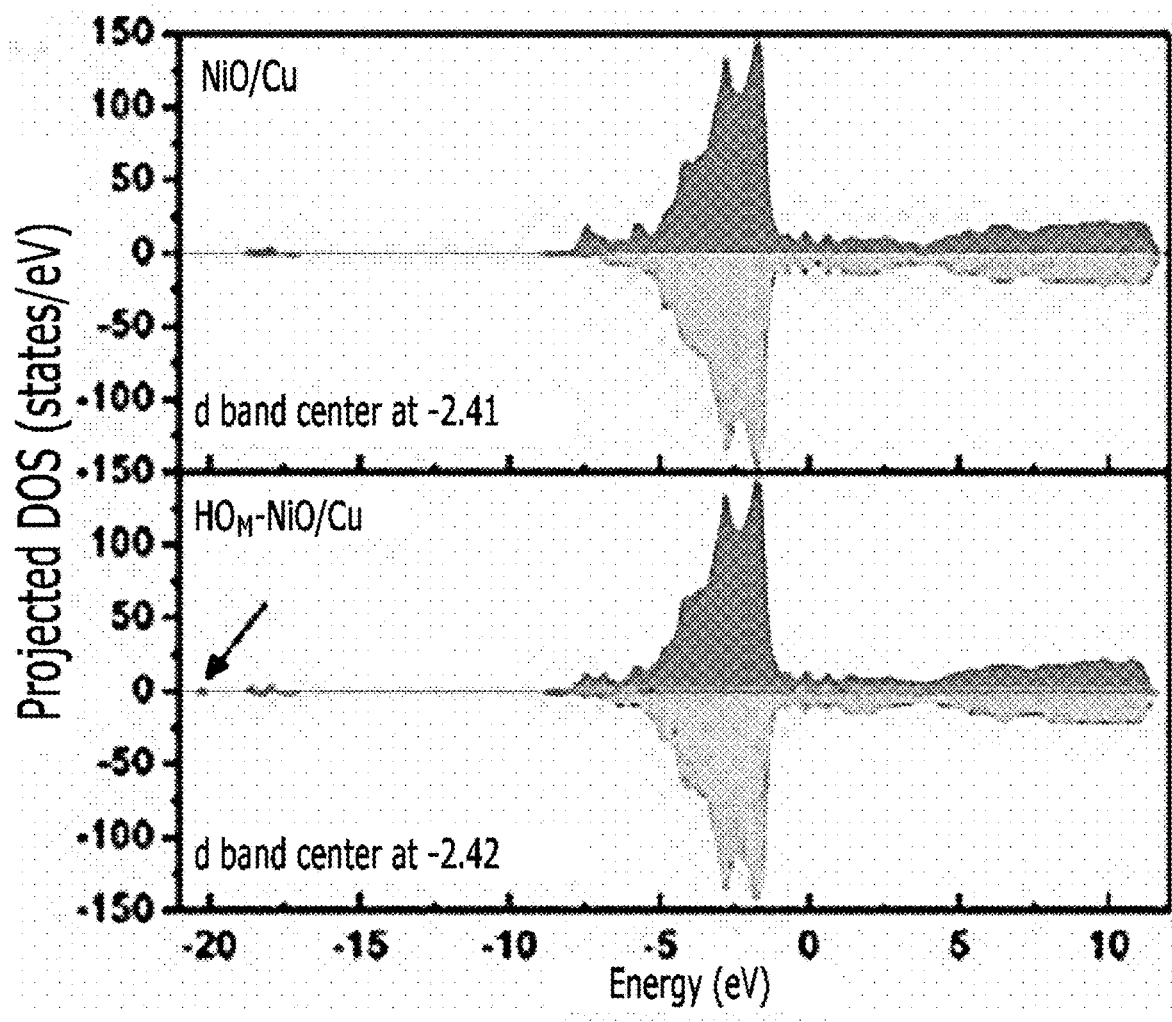

FIGS. 6A-6C are graphs showing theoretical calculation results of an HER activation energy and an electronic structure of a second transition metal component of the catalyst for hydrogen evolution reaction (HER) according to an implementation of the present disclosure.

FIG. 6A shows the surface composition of the four different catalysts (Cu, NiO/Cu, $HO_M$—NiO/Cu and $HO_H$—NiO/Cu) used in the calculations. FIG. 6B shows the free energy diagram of HER for these four catalyst surfaces (TS denotes the activated $H_2O$ dissociation energy in the transition state). FIG. 6C shows the expected density of states (PDOS) for NiO/Cu and $HO_M$—NiO/Cu with different D-band centers.

Specifically, to understand the improved HER dynamics in the $HO_M$—NiO/Cu model, the functions of hydroxylation and heterointerface were investigated in detail. The obtained electrochemical data fully describe a promoter of OH$^-$ for water dissociation due to the low Tafel slope.

We identified that $H_2O$ and H both weakly couple to the Cu surface (FIG. 6B), leading to a large kinetic barrier to the water dissociation step, which is consistent with previous reports.

NiO/Cu has an advantage in $H_2O$ adsorption (−0.72 eV) but has larger energy barrier of 0.55 eV for $H_2O$ dissociation (G(H—OH)). The G(H—OH) of $HO_M$—NiO/Cu and that of $HO_H$—NiO/Cu are 0.13 and 0.4 eV, respectively, thus indicating that the moderate OH$^-$ modification destabilizes water molecules more efficiently.

We also identify that the energy barrier to the transition state of water dissociation (G(TS)=0.92 eV) and optimal $H_2$ generation energy (G($H_2$)=−0.12 eV) in the $HO_M$—NiO/Cu slab is much lower than that in the others. This is indicative of a favorable HER.

In addition, it was found that the OH$^-$ generated in the Volmer step was easily desorbed from the $HO_M$—NiO/Cu surface due to the reduced affinity thereof to oxygen (G(OH) =0.11 eV).

This trend is further indicated based on the farther away d-band central Fermi energy level (E-Fermi) after OH$^-$ modification. This demonstrates that the oxygen affinity is reduced so that free $H_2O$ molecules may continuously attach thereto and dissociate (FIG. 6C). This promotes water dissociation.

Experimental Example 6

FIGS. 7A-7D are graphs showing the results of hydrogen spillover experiments of the catalysts for hydrogen evolution reaction (HER) according to an embodiment of the present disclosure.

Figure 7A:
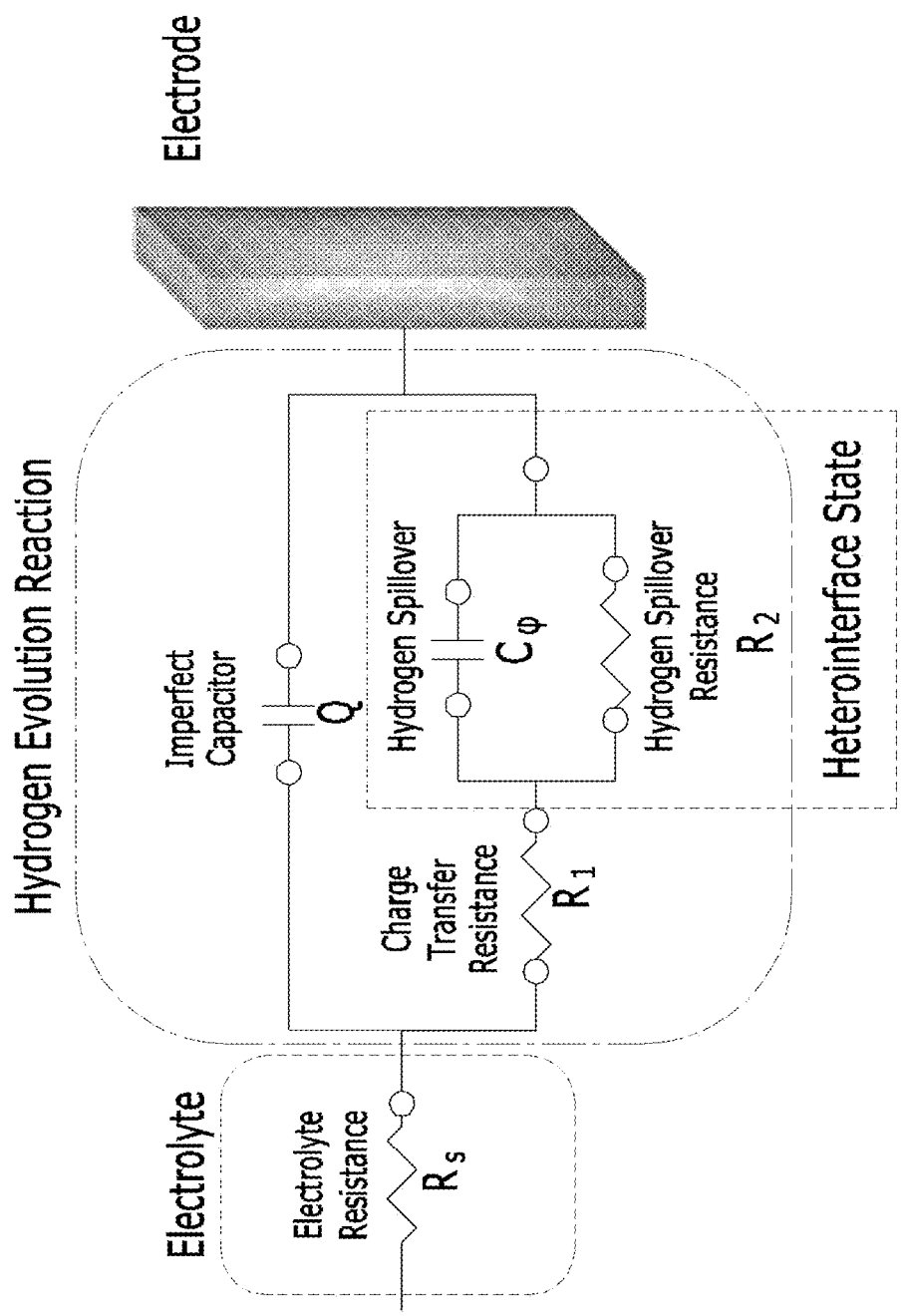
FIGS. 7A-7D are graphs showing the results of hydrogen spillover experiments of the catalysts for hydrogen evolution reaction (HER) according to an embodiment of the present disclosure.

FIG. 7A is an equivalent circuit model used for fitting impedance data.

Since a determining step of the HER rate is always H$^+$ coupling at the Cu site (Heyrovsky-Tafel step), it is important to form a channel for the hydrogen migration from the original site (O in NiO) to Cu through the interfacial pathway. Electrochemical impedance spectroscopy (EIS) analysis may be used to track H$^+$ migration around the active center of the surface during HER.

Figure 7B:
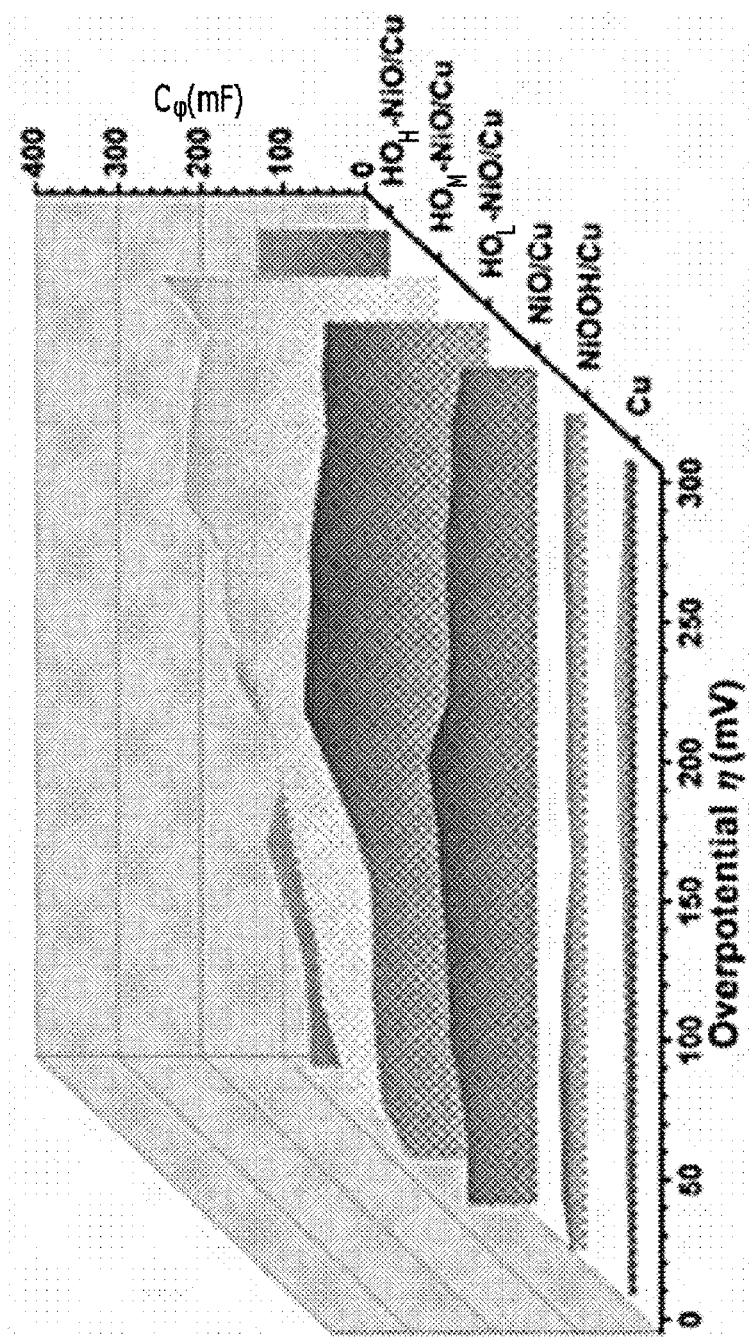

FIG. 7B is hydrogen adsorption capacity ($C_\phi$) vs. η plot for the 1 M KOH catalyst.

When η is lower than 200 mV, all derivative curves increase development until a slightly fluctuating plateau occurs, indicating that saturated hydrogen is adsorbed to the catalyst surface with higher η. In all HO—NiO/Cu samples, more hydrogen adsorption may be observed with smaller $R_2$ values. As a result, hydrogen overflows into the coupling center.

Figure 7C:
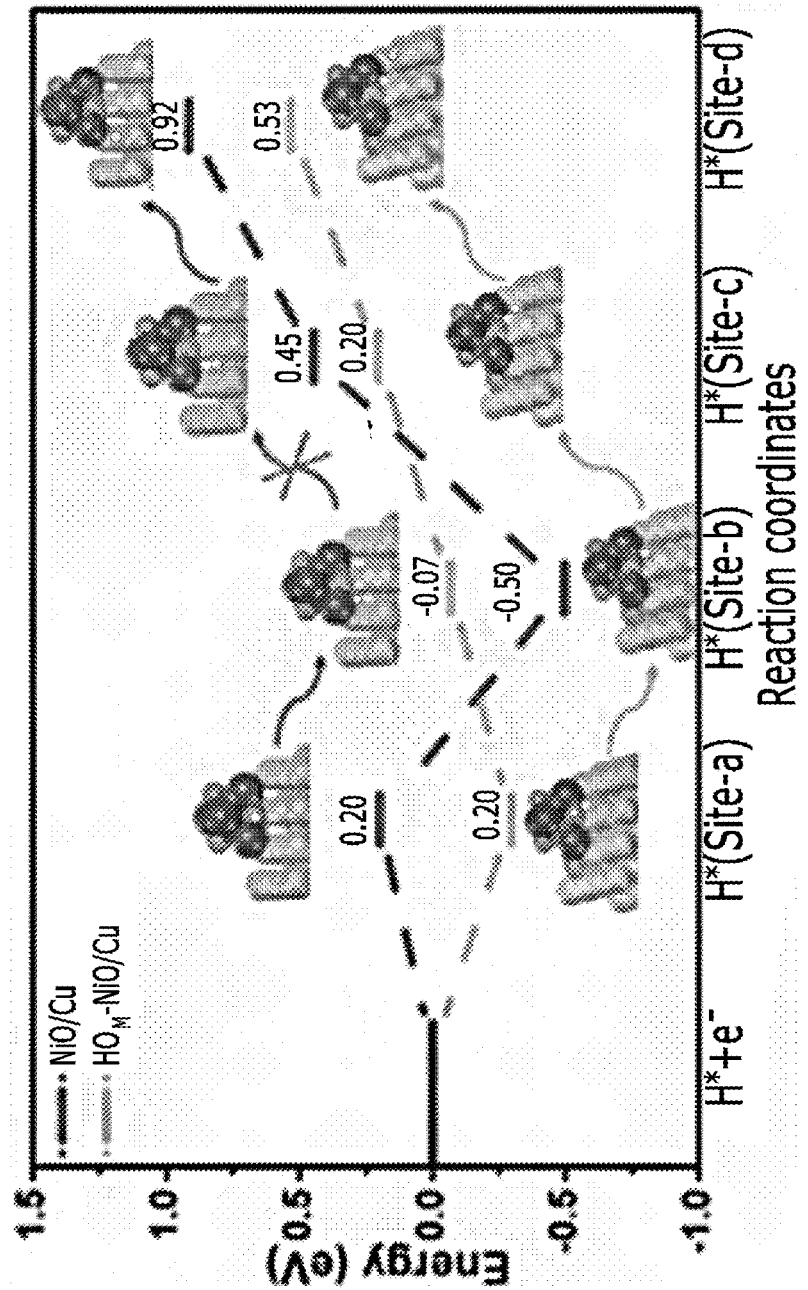
Figure 7D:
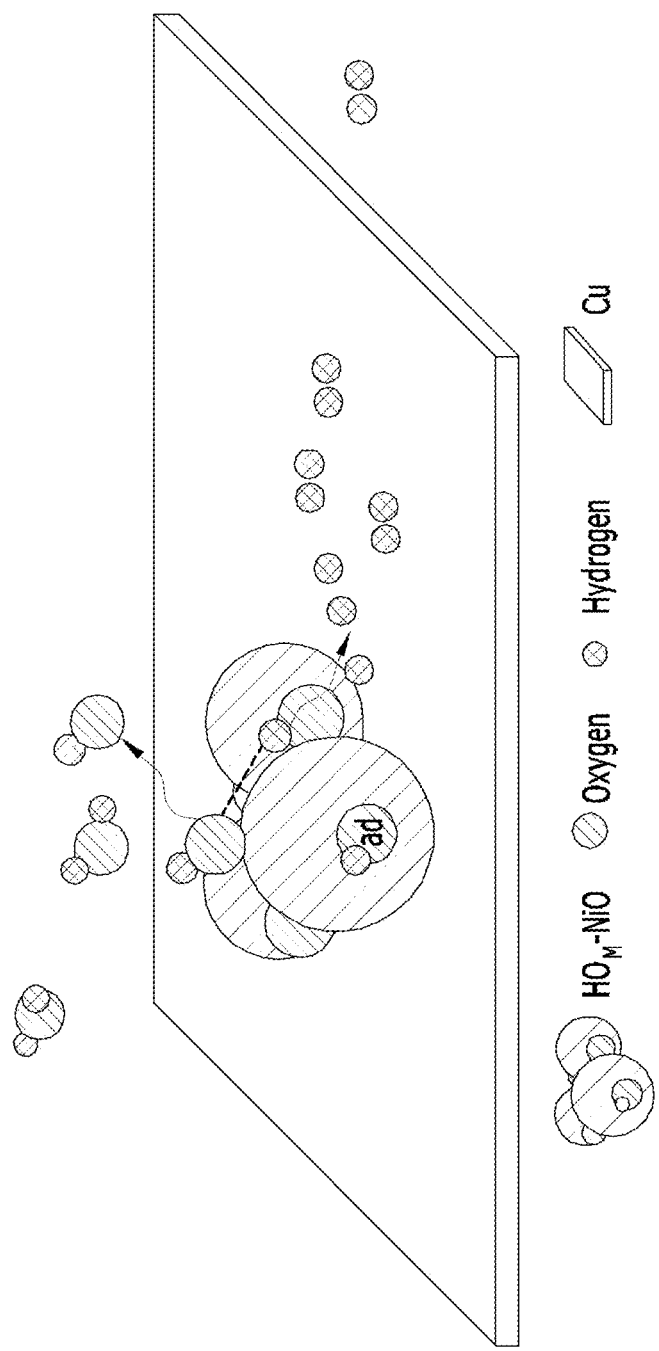

FIG. 7C shows the calculated free energy diagrams for hydrogen spillover of NiO/Cu (green) and $HO_M$—NiO/Cu (orange). Inset in FIG. 7C shows the optimized $H^+$ (yellow ball) adsorption structure at various sites, and FIG. 7D shows the proposed catalyst mechanism of HER for $HO_M$—NiO/Cu.

DFT calculations were performed to describe hydrogen spillover from NiO to Cu in the presence or absence of $OH^-$ (FIG. 7C).

It was identified that the adsorption energy of the $H^+$ site a on the NiO/Cu surface (bridge O shown in FIG. 6D) was a positive value of 0.2 eV, whereas the adsorption energy of $HO_M$—NiO/Cu was a negative value of −0.3 eV. This is consistent with the EIS results, where fewer $H^+$ species may be retained on the old surface. Nevertheless, a −0.5 eV of ($G_H$) site b (O—Cu bridge) indicates that NiO/Cu is limited due to hydrogen accumulation, making it difficult to transfer hydrogen to the site through the site c (Cu—Cu). -d (top of Cu) is due to a significant energy barrier. Thus, NiO/Cu catalysts have limited hydrogen evolution efficiencies conceptualized as having fewer $H^+$ sources and preventing spillover.

After hydroxylation, the $HO_M$—NiO/Cu surface has abundant hydrogen coverage due to accelerated water electrolysis. Weakened $H^+$ adsorption from site a to site d suggests a smooth interfacial channel for hydrogen spillover from the NiO to NiO/Cu interface to Cu (FIG. 7C). In detail, $H^+$ enriched by enhanced water electrolysis is initially stabilized at adjacent O sites and then transferred stepwise through the hetero-interface to the Cu surface due to mild adsorption energy, thereby providing abundant ideal sites for $H_2$ formation and release (FIG. 7D).

From a thermodynamic point of view, this spillover channel enables rapid migration of hydrogen ($H^+$), which may be effectively utilized by Cu for $H_2$ generation.

The above description of the present disclosure is for illustrative purposes. A person with ordinary skill in the technical field to which the present disclosure belongs may easily modify the disclosure into another specific form without changing the technical idea or essential characteristics of the present disclosure. Therefore, it should be understood that the embodiments as described above are illustrative in all respects and not restrictive. For example, each component described as a single type may be implemented in a distributed manner, and similarly, components described in a distributed manner may be implemented in a coupled form.

The scope of the present disclosure is indicated by the claims to be described later rather than the detailed description, and all changes or modifications derived from the meaning and scope of the claims and their equivalent concepts should be construed as being included in the scope of the present disclosure.

What is claimed is:

1. A catalyst for hydrogen evolution reaction (HER) comprising:
   a first transition metal matrix; and
   a second transition metal oxide formed on the first transition metal matrix;
   wherein a hydroxyl group is introduced on the second transition metal oxide, and
   wherein the second transition metal oxide is formed on a substrate surface to form a hydrogen spillover channel on a hetero-interface.

2. The catalyst for HER of claim 1, wherein the second transition metal oxide is functionalized by having the hydroxyl group locally introduced thereto.

3. The catalyst for HER of claim 1, wherein the first transition metal and the second transition metal are different from each other.

4. The catalyst for HER of claim 3, wherein each of the first transition metal and the second transition metal independently includes one selected from the group consisting of Cu, Ni, W, Mo, Sc, Ti, V, Cr, Mn, Fe, Co, Zn, Y, Zr, Nb, Tc, Ru, Rh, Pd, Ag, Cd, Hf, Ta, Re, Os, Ir, Pt, Au, Hg, Rf, Db, Sg, Bh, Hs, Mt, Ds, Rg, Cn, and combinations thereof.

5. The catalyst for HER of claim 1, wherein the second transition metal oxide includes a nanocluster having a size of 10 nm to 100 nm.

6. The catalyst for HER of claim 1, wherein the catalyst for the hydrogen evolution reaction (HER) includes a nanowire having a size of 100 nm to 300 nm.

7. The catalyst for HER of claim 1, wherein the catalyst for the hydrogen evolution reaction (HER) is used as an electrode catalyst for alkaline water electrolysis.

8. A water electrolysis system comprising the catalyst for hydrogen evolution reaction (HER) according to claim 1.

9. A method for preparing the catalyst for hydrogen evolution reaction (HER) of claim 1, the method comprising:
   bonding the second transition metal oxide to the first transition metal matrix; and
   introducing the hydroxyl group on the second transition metal oxide using cyclic voltammetry (CV).

10. The method of claim 9, wherein in the introducing of the hydroxyl group, the second transition metal oxide is functionalized by having the hydroxyl group locally introduced thereto.

11. The method of claim 9, wherein the bonding of the second transition metal oxide to the first transition metal matrix is achieved by one selected from the group consisting of an electrodeposition method, a coevaporation method, a sputtering method, an RF sputtering method, a DC sputtering method, a reactive sputtering method, an ion beam sputtering method, an evaporation method, a chemical vapor deposition (CVD) method, a low-pressure chemical vapor deposition (LPCVD) method, a plasma-enhanced chemical vapor deposition (PECVD) method, an ion plating method, an E-beam evaporation method, a metal-organic chemical vapor deposition (MOCVD) method, a molecular beam epitaxy (MBE) method, a screen printing method, a particle deposition method, an atomic layer epitaxy method, and combinations thereof.

12. The method of claim 9, wherein the cyclic voltammetry is performed under basic electrolytes.

13. The method of claim 12, wherein the basic electrolytes include one selected from the group consisting of KOH, NaOH, LiOH, $Ca(OH)_2$, $NaBH_4$, and combinations thereof.

14. The method of claim 12, wherein the basic electrolyte is used at a concentration of 0.05 M to 5 M.

15. The method of claim 9, wherein the method further comprises:
   washing and drying a product prepared in the bonding step; and
   annealing the product.

16. The method of claim 15, wherein the annealing step is performed in a temperature range of 100° C. to 700° C.

* * * * *